United States Patent
Shih et al.

(10) Patent No.: US 10,667,323 B1
(45) Date of Patent: May 26, 2020

(54) METHOD AND APPARATUS FOR RELEASING PRECONFIGURED UPLINK RESOURCES CONFIGURATION IN A WIRELESS COMMUNICATION SYSTEM

(71) Applicant: ASUSTek Computer Inc., Taipei (TW)

(72) Inventors: Tun-Huai Shih, Taipei (TW); Yu-Hsuan Guo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/676,214

(22) Filed: Nov. 6, 2019

Related U.S. Application Data

(60) Provisional application No. 62/771,726, filed on Nov. 27, 2018.

(51) Int. Cl.
  *H04W 76/27* (2018.01)
  *H04W 76/19* (2018.01)
  *H04W 76/30* (2018.01)
  *H04W 72/04* (2009.01)

(52) U.S. Cl.
  CPC ....... *H04W 76/27* (2018.02); *H04W 72/0493* (2013.01); *H04W 76/19* (2018.02); *H04W 76/30* (2018.02)

(58) Field of Classification Search
  CPC ..... H04W 76/27; H04W 76/19; H04W 76/30; H04W 72/0493
  See application file for complete search history.

(56) References Cited

U.S. PATENT DOCUMENTS

| | | | | |
|---|---|---|---|---|
| 2012/0113904 A1* | 5/2012 | Anderson | ............. | H04W 76/28 370/329 |
| 2015/0156793 A1* | 6/2015 | Dai | ................... | H04W 72/1242 370/329 |
| 2017/0289983 A1* | 10/2017 | Lei | ...................... | H04W 72/042 |
| 2020/0029351 A1* | 1/2020 | Xiang | ...................... | H04L 5/00 |

* cited by examiner

*Primary Examiner* — Christine Ng
(74) *Attorney, Agent, or Firm* — Blue Capital Law Firm, P.C.

(57) ABSTRACT

Methods and apparatuses for releasing preconfigured uplink resources configuration in a wireless communication system are disclosed herein. In one method, a User Equipment (UE) receives a configuration of a preconfigured uplink resource (PUR) when the UE is in a first RRC_CONNECTED state. The UE enters a first RRC_IDLE state from the first RRC_CONNECTED state. The UE performs a first transmission using the PUR when the UE is in the first RRC_IDLE state. The UE enters a second RRC_CONNECTED state from the first RRC_IDLE state. The UE suspends the configuration when the UE is in the second RRC_CONNECTED state. The UE resumes the configuration when the UE enters a second RRC_IDLE state from the second RRC_CONNECTED state. The UE performs a second transmission using the PUR when the UE is in the second RRC_IDLE state.

18 Claims, 14 Drawing Sheets

US 10,667,323 B1

METHOD AND APPARATUS FOR RELEASING PRECONFIGURED UPLINK RESOURCES CONFIGURATION IN A WIRELESS COMMUNICATION SYSTEM

CROSS-REFERENCE TO RELATED APPLICATIONS

The present application claims the benefit of U.S. Provisional Patent Application Ser. No. 62/771,726 filed on Nov. 27, 2018, the entire disclosure of which is incorporated herein in its entirety by reference.

FIELD

This disclosure generally relates to wireless communication networks, and more particularly, to a method and apparatus for releasing preconfigured uplink resources configuration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In one method, a User Equipment (UE) receives a configuration of a preconfigured uplink resource (PUR) when the UE is in a first RRC_CONNECTED state. The UE enters a first RRC_IDLE state from the first RRC_CONNECTED state. The UE perform a first transmission using the PUR when the UE is in the first RRC_IDLE state. The UE enters a second RRC_CONNECTED state from the first RRC_IDLE state. The UE suspends the configuration when the UE is in the second RRC_CONNECTED state. The UE resumes the configuration when the UE enters a second RRC_IDLE state from the second RRC_CONNECTED state. The UE performs a second transmission using the PUR when the UE is in the second RRC_IDLE state.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: TS 36.300 V15.3.0, "E-UTRA and E-UTRAN, Overall description, Stage 2"; TS 36.321 V15.3.0, "E-UTRA, MAC protocol specification"; RAN1 #94 Chairman's Note; RAN1 #94bis Chairman's Note; RAN1 #95 Chairman's Note; and TS 36.331 V15.3.0, "E-UTRA, RRC protocol. The standards and documents listed above are hereby expressly incorporated by reference in their entirety.

Figure 1:
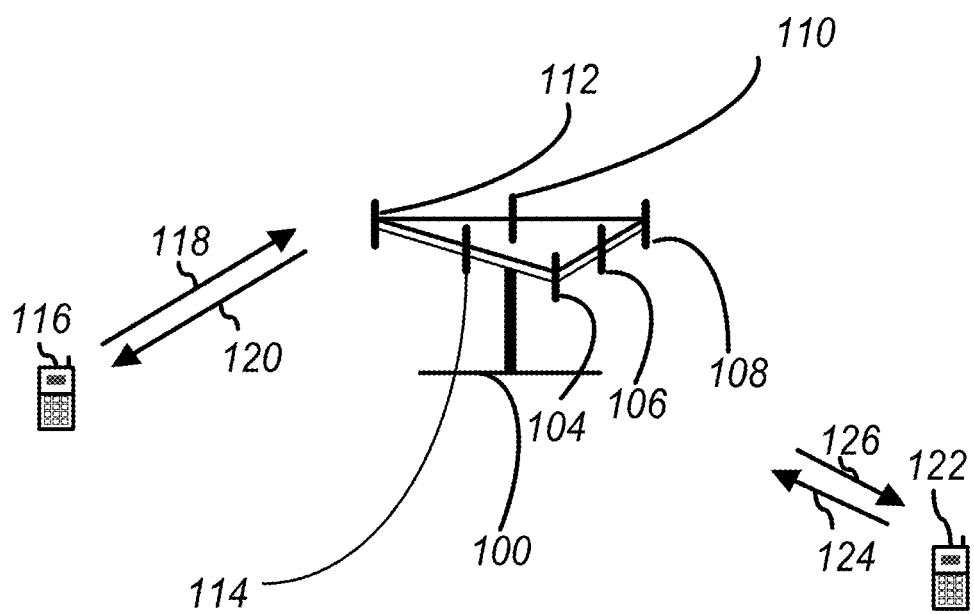
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
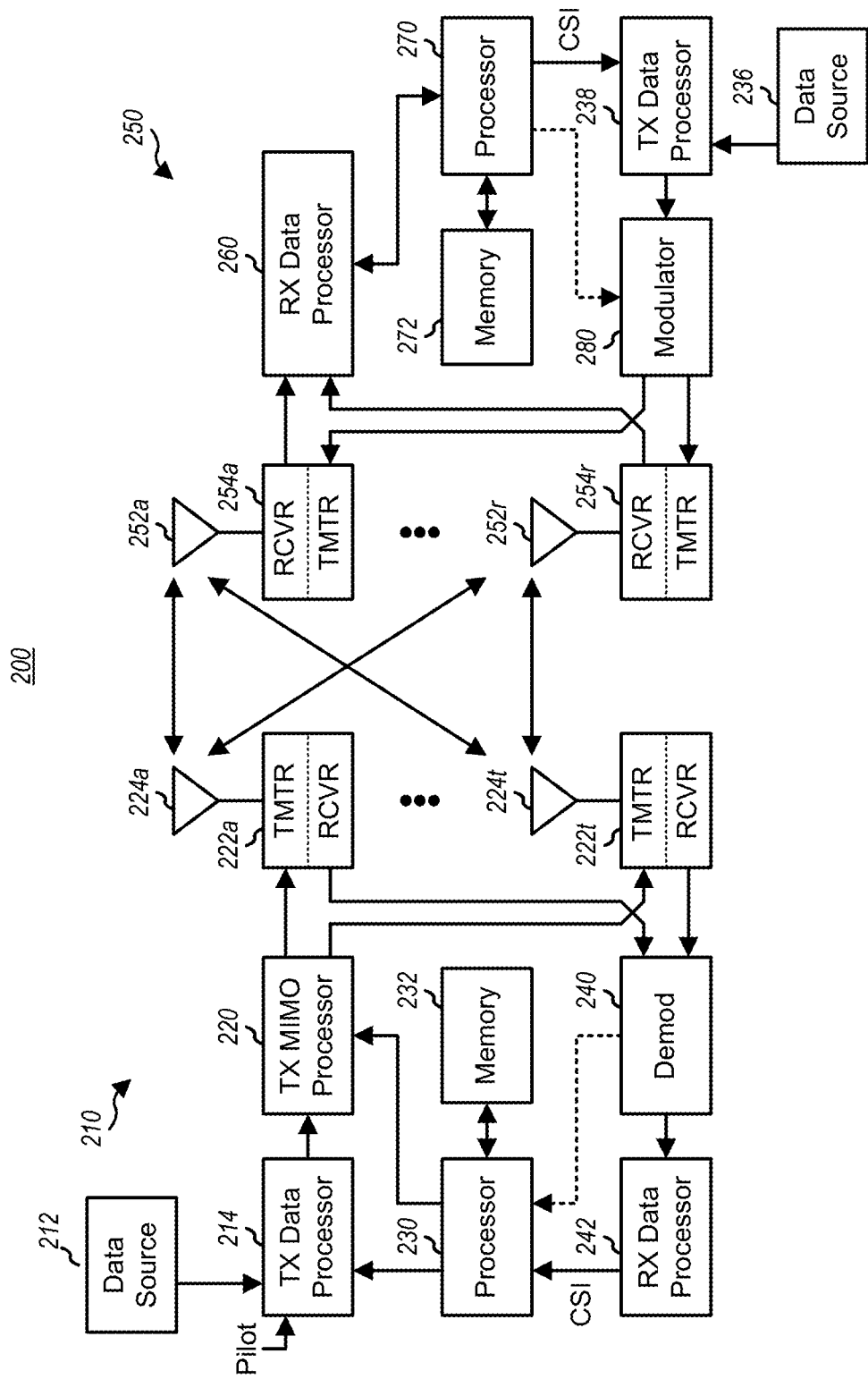
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
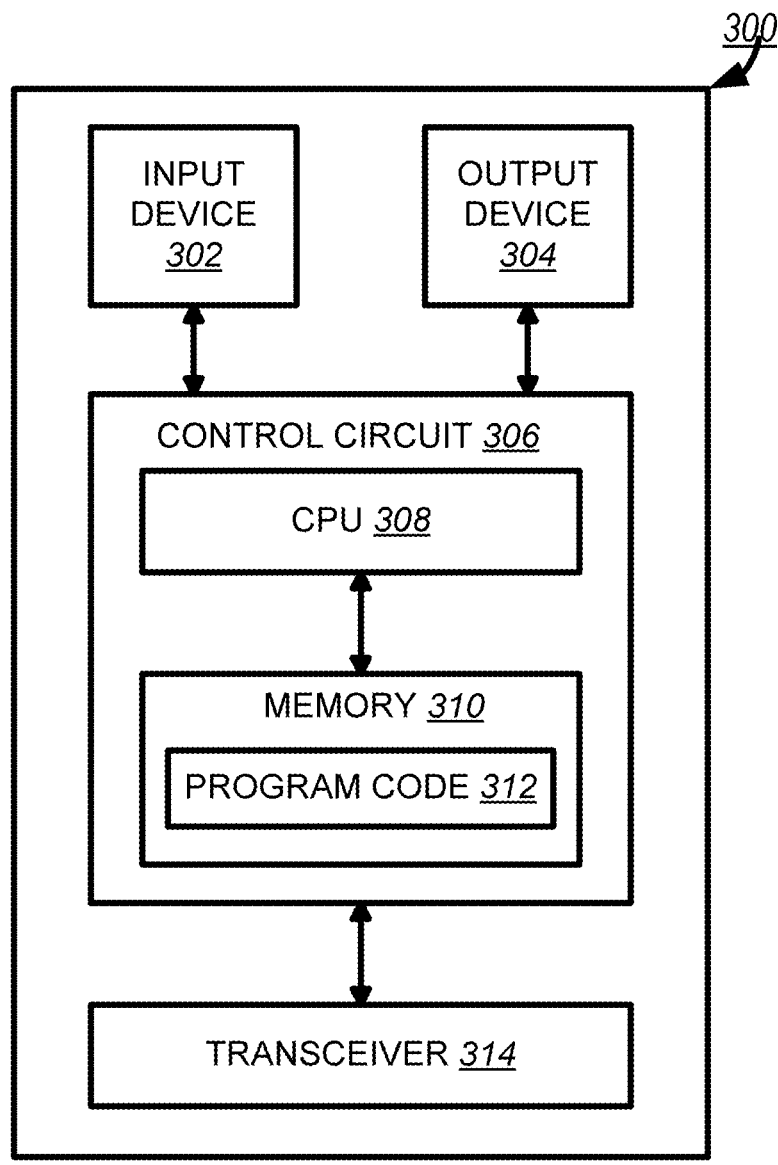
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
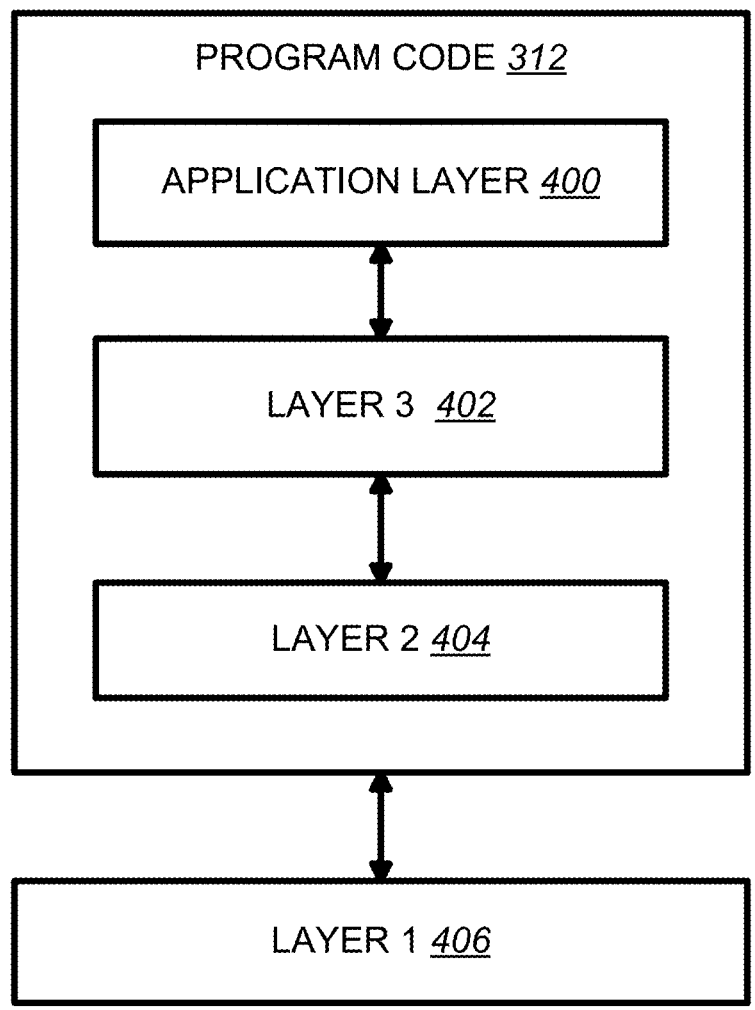
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally perform TS 36.300 V15.3.0s physical connections.

Early Data Transmission (EDT) and Wake UP Signal (WUS) are introduced in LTE Release-15. Some texts related to EDT and WUS are quoted below from 3GPP TS 36.300 V15.3.0 and 3GPP TS 36.331 V15.3.0. 3GPP TS 36.300 V15.3.0 discloses the following:

7.3b EDT
7.3b.1 General
EDT allows one uplink data transmission optionally followed by one downlink data transmission during the random access procedure.
EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.
EDT is only applicable to BL UEs, UEs in Enhanced Coverage and NB-IoT UEs.
7.3b.2 EDT for Control Plane CIoT EPS Optimizations
EDT for Control Plane CIoT EPS optimizations, as defined in TS 24.301 [20], is characterized as below:
　Uplink user data are transmitted in a NAS message concatenated in UL RRCEarlyDataRequest message on CCCH;
　Downlink user data are optionally transmitted in a NAS message concatenated in DL RRCEarlyDataComplete message on CCCH;
　There is no transition to RRC CONNECTED.
The EDT procedure for Control Plane CIoT EPS optimizations is illustrated in FIG. 7.3b-1.

Figure 5:
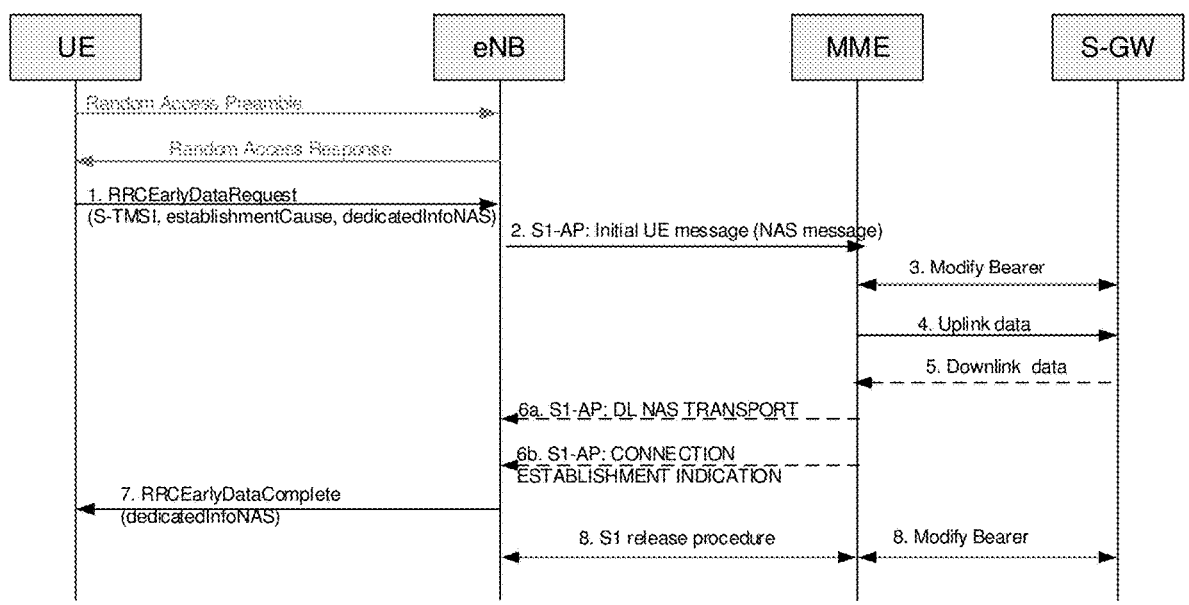
FIG. 5 is a reproduction of FIG. 7.3b-1 showing EDT for Control Plane CIoT EPS Optimizations taken from 3GPP TS36.300 V15.3.0.
Figure 7:
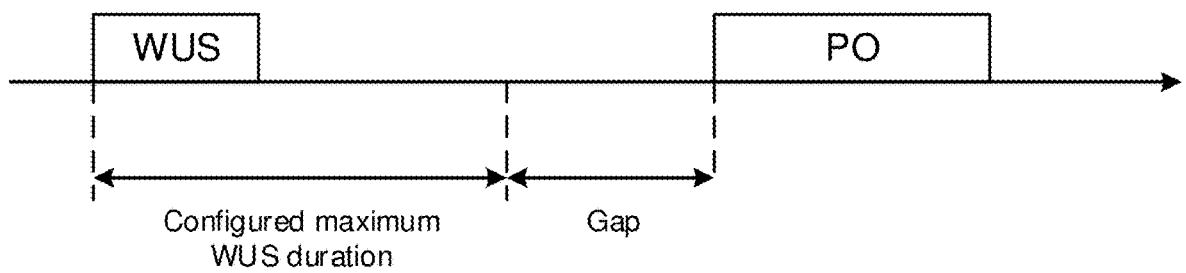
FIG. 7 is a reproduction of FIG. 10.1.4-1 illustrating WUS timing taken from 3GPP TS36.300 V15.3.0.

FIG. 5 (a Reproduction of FIG. 7.3b-1: EDT for Control Plane CIoT EPS Optimizations)

0. Upon connection establishment request for Mobile Originated data from the upper layers, the UE initiates the early data transmission procedure and selects a random access preamble configured for EDT.
1. UE sends RRCEarlyDataRequest message concatenating the user data on CCCH.
2. The eNB initiates the S1-AP Initial UE message procedure to forward the NAS message and establish the S1 connection. The eNB may indicate in this procedure that this connection is triggered for EDT.
3. The MME requests the S-GW to re-activate the EPS bearers for the UE.
4. The MME sends the uplink data to the S-GW.
5. If downlink data are available, the S-GW sends the downlink data to the MME.
6. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.
7. If no further data are expected, the eNB can send the RRCEarlyDataComplete message on CCCH to keep the UE in RRC_IDLE. If downlink data were received in step 6, they are concatenated in RRCEarlyDataComplete message.
8. The S1 connection is released and the EPS bearers are deactivated.
NOTE: If the MME or the eNB decides to move the UE in RRC_CONNECTED mode, RRCConnectionSetup message is sent in step 7 to fall back to the legacy RRC Connection establishment procedure; the eNB will discard the zero-length NAS PDU received in msg5.
7.3b.3 EDT for User Plane CIoT EPS optimizations
EDT for User Plane CIoT EPS optimizations, as defined in TS 24.301 [20], is characterized as below:
　The UE has been provided with a NextHopChainingCount in the RRCConnectionRelease message with suspend indication;
　Uplink user data are transmitted on DTCH multiplexed with UL RRCConnectionResumeRequest message on CCCH;
　Downlink user data are optionally transmitted on DTCH multiplexed with DL RRCConnectionRelease message on DCCH;
　The short resume MAC-I is reused as the authentication token for RRCConnectionResumeRequest message and is calculated using the integrity key from the previous connection;
　The user data in uplink and downlink are ciphered. The keys are derived using the NextHopChainingCount provided in the RRCConnectionRelease message of the previous RRC connection;
　The RRCConnectionRelease message is integrity protected and ciphered using the newly derived keys;
　There is no transition to RRC CONNECTED.
The EDT procedure for User Plane CIoT EPS optimizations is illustrated in FIG. 7.3b-2.

Figure 6:
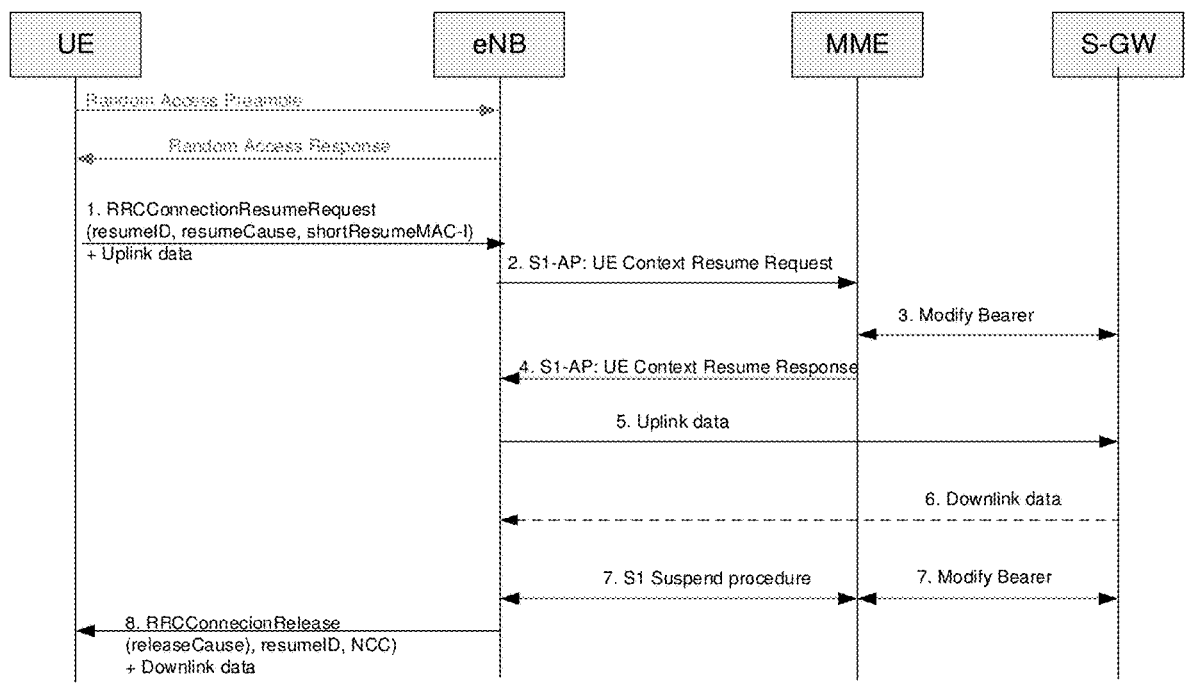
FIG. 6 is a reproduction of FIG. 7.3b-2 showing EDT for User Plane CIoT EPS Optimizations taken from 3GPP TS36.300 V15.3.0.

FIG. 6 (a Reproduction of FIG. 7.3b-2: EDT for User Plane CIoT EPS Optimizations)

0. Upon connection resumption request for Mobile Originated data from the upper layers, the UE initiates the early data transmission procedure and selects a random access preamble configured for EDT.
1. The UE sends an RRCConnectionResumeRequest to the eNB, including its Resume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.

2. The eNB initiates the S1-AP Context Resume procedure to resume the S1 connection and re-activate the S1-U bearers.
3. The MME requests the S-GW to re-activate the S1-U bearers for the UE.
4. The MME confirms the UE context resumption to the eNB.
5. The uplink data are delivered to the S-GW.
6. If downlink data are available, the S-GW sends the downlink data to the eNB.
7. If no further data are expected from the S-GW, the eNB can initiate the suspension of the S1 connection and the deactivation of the S1-U bearers.
8. The eNB sends the RRCConnectionRelease message to keep the UE in RRC_IDLE. The message includes the release Cause set to rrc-Suspend, the resumeID, the NextHopChainingCount and drb-ContinueROHC which are stored by the UE. If downlink data were received in step 6, they are sent ciphered on DTCH multiplexed with the RRCConnectionRelease message on DCCH.

NOTE: If the MME or eNB decides the UE to move in RRC_CONNECTED mode, RRCConnectionResume message is sent in step 7 to fall back to the RRC Connection resume procedure. In that case, the RRCConnectionResume message is integrity protected and ciphered with the keys derived in step 1 and the UE ignores the NextHopChainingCount included in the RRCConnectionResume message. Downlink data can be transmitted on DTCH multiplexed with the RRCConnectionResume message.

10.1 Intra E-UTRAN
10.1.4 Paging and C-Plane Establishment
Paging groups (where multiple UEs can be addressed) are used on PDCCH:
    Precise UE identity is found on PCH;
    DRX configurable via BCCH and NAS, for NB-IoT DRX configurable via BCCH only;
    Only one subframe allocated per paging interval per UE;
    The network may divide UEs to different paging occasions in time;
    There is no grouping within paging occasion;
    One paging RNTI for PCH.
When extended DRX (eDRX) is used in idle mode, the following are applicable:
    The DRX cycle is extended up to and beyond 10.24 s in idle mode, with a maximum value of 2621.44 seconds (43.69 minutes); For NB-IoT, the maximum value of the DRX cycle is 10485.76 seconds (2.91 hours);
    The hyper SFN (H-SFN) is broadcast by the cell and increments by one when the SFN wraps around;
    Paging Hyperframe (PH) refers to the H-SFN in which the UE starts monitoring paging DRX during a
    Paging Time Window (PTW) used in ECM-IDLE. The PH is determined based on a formula that is known by the MME, UE and eNB as a function of eDRX cycle and UE identity;
    During the PTW, the UE monitors paging for the duration of the PTW (as configured by NAS) or until a paging message is including the UE's NAS identity received for the UE, whichever is earlier. The possible starting offsets for the PTW are uniformly distributed within the PH and defined in TS 36.304 [11];
    MME uses the formulas defined in TS 36.304 [11] to determine the PH as well as the beginning of the PTW and sends the S1 paging request just before the occurrence of the start of PTW or during PTW to avoid storing paging messages in the eNB;
    ETWS, CMAS, PWS requirement may not be met when a UE is in eDRX. For EAB, if the UE supports SIB14, when in extended DRX, it acquires SIB14 before establishing the RRC connection;
    When the eDRX cycle is longer than the system information modification period, the UE verifies that stored system information remains valid before establishing an RRC connection. Paging message can be used for system information change notification, when including systemInfoModification-eDRX, for a UE configured with eDRX cycle longer than the system information modification period.

NB-IoT UEs, BL UEs or UEs in enhanced coverage can use WUS, when configured in the cell, to reduce the power consumption related to paging monitoring.

When WUS is used in idle mode, the following are applicable:
    The WUS is used to indicate that the UE shall monitor MPDCCH or NPDCCH to receive paging in that cell;
    For a UE not configured with extended DRX, the WUS is associated to one paging occasion (N=1);
    For a UE configured with extended DRX, the WUS can be associated to one or multiple paging occasion(s) (N≥1) in a PTW;
    If UE detects the WUS, the UE shall monitor the following N paging occasions unless it has received a paging message;
    The paging operation in the MME is not aware of the use of the WUS in the eNB.

Figure 10:
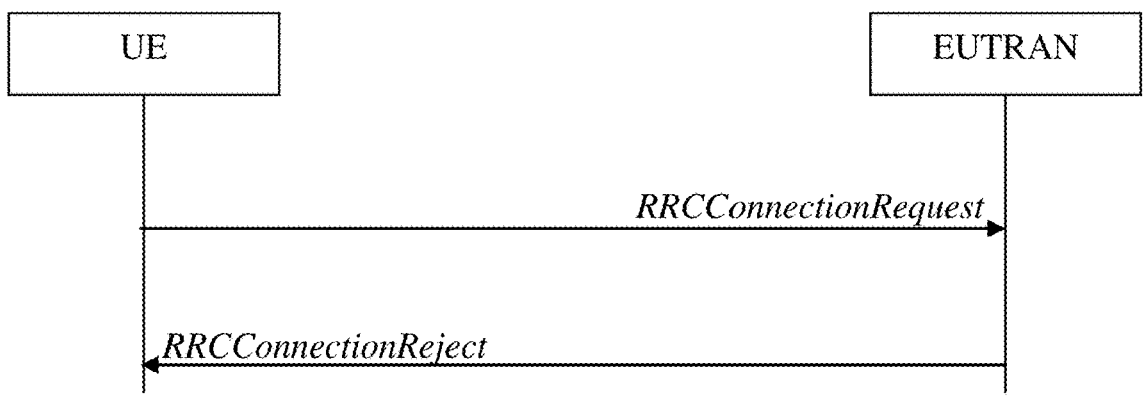
FIG. 10 is a reproduction of FIG. 5.3.3.1-2 illustrating network rejected RRC connection establishment taken from 3GPP TS36.321 V15.3.0.

The timing between WUS and the paging occasion (PO) is illustrated in FIG. 10.1.4-1. The UE can expect WUS repetitions during "Configured maximum WUS duration" but the actual WUS transmission can be shorter, e.g. for UE in good coverage. The UE does not monitor WUS during the non-zero "Gap".

FIG. 7 (a Reproduction of FIG. 10.1.4-1: Illustration of WUS Timing)

For NB-IoT, UE in RRC_IDLE receives paging on the anchor carrier or on a non anchor carrier based on system information.

10.1.5 Random Access Procedure
The random access procedure is characterized by:
    Common procedure for FDD and TDD;
    One procedure irrespective of cell size and the number of serving cells when CA is configured;
The random access procedure is performed for the following events related to the PCell:
    Initial access from RRC_IDLE;
    RRC Connection Re-establishment procedure, as defined in TS 24.301 [20];
    Handover, except for NB-IoT or when RACH-less HO is configured;
    DL data arrival during RRC_CONNECTED requiring random access procedure:
        E.g. when UL synchronisation status is "non-synchronised".
    UL data arrival during RRC_CONNECTED requiring random access procedure:

E.g. when UL synchronisation status is "non-synchronised" or there are no PUCCH resources for SR available.

For positioning purpose during RRC_CONNECTED requiring random access procedure:
E.g. when timing advance is needed for UE positioning.

The random access procedure is also performed on a SCell to establish time alignment for the corresponding sTAG.

For E-UTRA connected to 5GC, the random access procedure is also performed for the transition from RRC_INACTIVE.

In DC, the random access procedure is also performed on at least PSCell upon SCG addition/modification, if instructed, or upon DL/UL data arrival during RRC_CONNECTED requiring random access procedure. The UE initiated random access procedure is performed only on PSCell for SCG.

Furthermore, the random access procedure takes two distinct forms:
  Contention based (applicable to all six events, but the sixth event for positioning is applicable for NB-IoT only);
  Non-contention based (applicable to only handover, DL data arrival, positioning and obtaining timing advance alignment for a sTAG).

Normal DL/UL transmission can take place after the random access procedure.

An RN supports both contention-based and non-contention-based random access. When an RN performs the random access procedure, it suspends any current RN subframe configuration, meaning it temporarily disregards the RN subframe configuration. The RN subframe configuration is resumed at successful random access procedure completion. For NB-IoT, the random access procedure is performed on the anchor carrier or on a non anchor carrier based on system information.

10.1.5.1 Contention Based Random Access Procedure

Figure 8:
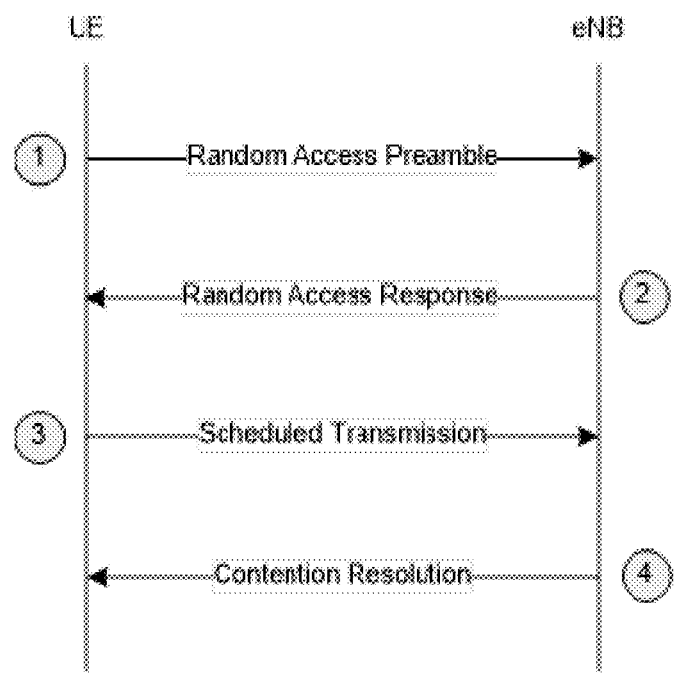
FIG. 8 is a reproduction of FIG. 10.1.5.1-1 illustrating Contention based Random Access Procedure taken from 3GPP TS36.300 V15.3.0.

The contention based random access procedure is outlined on FIG. 10.1.5.1-1 below:

FIG. 8 (a Reproduction of FIG. 10.1.5.1-1: Contention Based Random Access Procedure)

The four steps of the contention based random access procedures are:
1) Random Access Preamble on RACH in uplink:
   There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.
2) Random Access Response generated by MAC on DL-SCH:
   Semi-synchronous (within a flexible window of which the size is one or more TTI) with message 1;
   No HARQ;
   Addressed to RA-RNTI on PDCCH;
   Conveys at least RA-preamble identifier, Timing Alignment information for the pTAG, initial UL grant and assignment of Temporary C-RNTI (which may or may not be made permanent upon Contention Resolution);
   Intended for a variable number of UEs in one DL-SCH message.
3) First scheduled UL transmission on UL-SCH:
   Uses HARQ;
   Size of the transport blocks depends on the UL grant conveyed in step 2.
   For initial access:
     Conveys the RRC Connection Request generated by the RRC layer and transmitted via CCCH;
     Conveys at least NAS UE identifier but no NAS message;
     RLC TM: no segmentation.
   For RRC Connection Re-establishment procedure:
     Conveys the RRC Connection Re-establishment Request generated by the RRC layer and transmitted via CCCH;
     RLC TM: no segmentation;
     Does not contain any NAS message.
   After handover, in the target cell:
     Conveys the ciphered and integrity protected RRC Handover Confirm generated by the RRC layer and transmitted via DCCH;
     Conveys the C-RNTI of the UE (which was allocated via the Handover Command);
     Includes an uplink Buffer Status Report when possible.
   For other events:
     Conveys at least the C-RNTI of the UE;
   In the procedure to resume the RRC connection:
     Conveys the RRC Connection Resume Request generated by the RRC layer and transmitted via CCCH;
     Conveys a Resume ID to resume the RRC connection;
   For NB-IoT:
     In the procedure to setup the RRC connection:
       An indication of the amount of data for subsequent transmission(s) on SRB or DRB can be indicated.
     For EDT for Control Plane CIoT EPS Optimizations:
       Conveys the RRC Early Data Request generated by the RRC layer and transmitted via CCCH;
       Conveys NAS UE identifier and user data concatenated in a NAS message.
     For EDT for User Plane CIoT EPS Optimizations:
       Conveys the RRC Resume Request generated by the RRC layer and transmitted via CCCH;
       Conveys a Resume ID to resume the RRC connection.
     Conveys ciphered user data transmitted via DTCH.
4) Contention Resolution on DL:
   Early contention resolution shall be used i.e. eNB does not wait for NAS reply before resolving contention;
   For NB-IoT, for initial access, RRC connection resume procedure and RRC Connection Re-establishment procedure, eNB may transmit MAC PDU containing the UE contention resolution identity MAC control element without RRC response message;
   NOTE: In Release 13, NB-IoT UEs do not support the MAC PDU containing the UE contention resolution identity MAC control element without RRC response message for initial access, RRC connection resume procedure and RRC Connection Re-establishment procedure.

Not synchronised with message 3;
HARQ is supported;
Addressed to:
   The Temporary C-RNTI on PDCCH for initial access and after radio link failure;
   The C-RNTI on PDCCH for UE in RRC_CONNECTED.
HARQ feedback is transmitted only by the UE which detects its own UE identity, as provided in message 3, echoed in the Contention Resolution message;
For initial access, RRC Connection Re-establishment procedure and EDT for Control Plane CIoT EPS Optimizations, no segmentation is used (RLC-TM).

The Temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (step 4) can be cross-scheduled by the PCell.

When DC is configured, the first three steps of the contention based random access procedures occur on the PCell in MCG and PSCell in SCG. When CA is configured in SCG, the first three steps of the contention based random access procedures occur on the PSCell while contention resolution (step 4) can be cross-scheduled by the PSCell.

Figure 9:
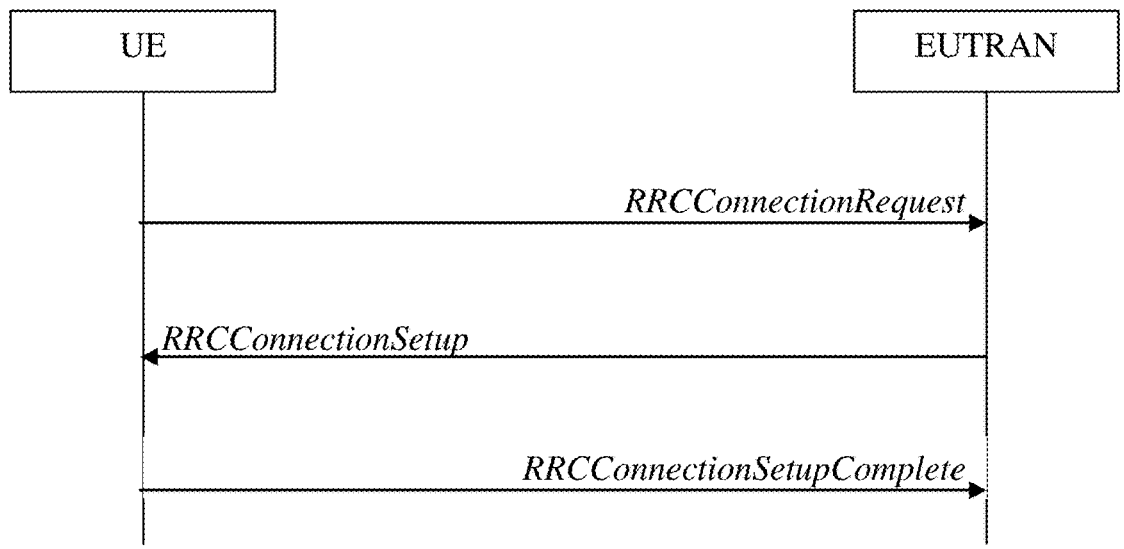
FIG. 9 is a reproduction of FIG. 5.3.3.1-1 illustrating successful RRC connection establishment taken from 3GPP TS36.321 V15.3.0.

3GPP TS 36.331 V15.3.0 Discloses the Following:
5.3 Connection Control
5.3.3 RRC Connection Establishment
5.3.3.1 General FIG. 9 (a Reproduction of FIG. 5.3.3.1-1: RRC Connection Establishment, Successful)

FIG. 10 (a Reproduction of FIG. 5.3.3.1-2: RRC Connection Establishment, Network Reject)

Figure 11:
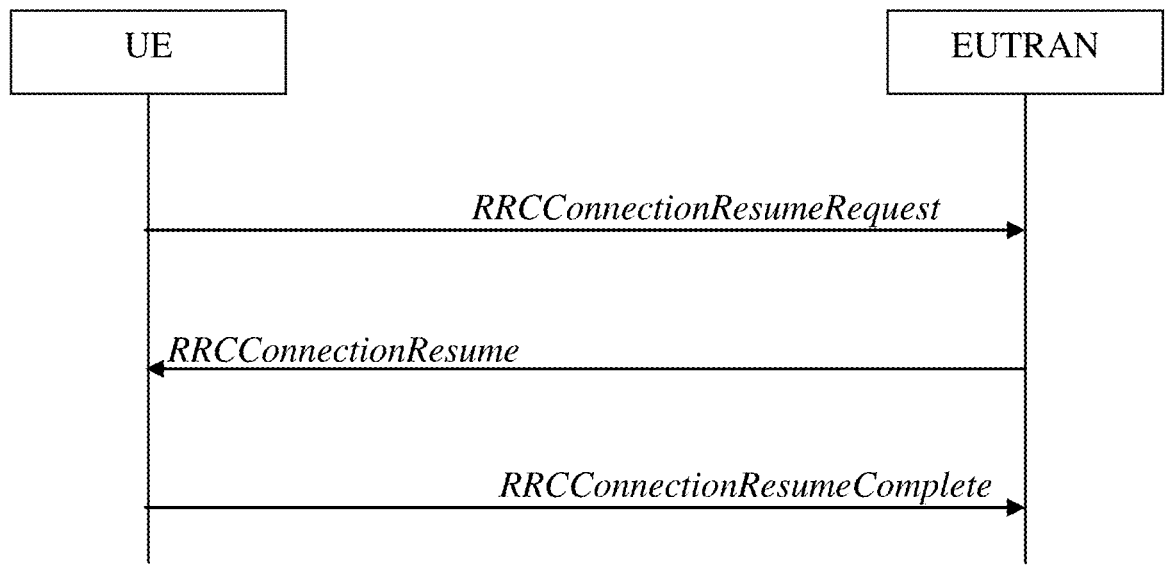
FIG. 11 is a reproduction of FIG. 5.3.3.1-3 illustrating RRC connection resume (suspended RRC connection or RRC_INACTIVE), or UP-EDT fallback to RRC connection resume, successful taken from 3GPP TS36.321 V15.3.0.

FIG. 11 (a Reproduction of FIG. 5.3.3.1-3: RRC Connection Resume (Suspended RRC Connection or RRC_INACTIVE), or UP-EDT Fallback to RRC Connection Resume, Successful)

Figure 12:
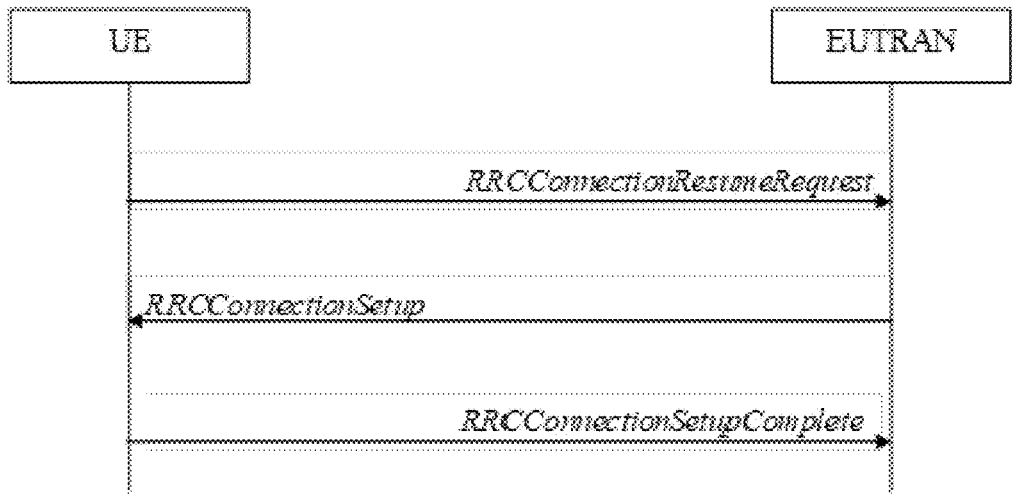
FIG. 12 is a reproduction of FIG. 5.3.3.1-4 illustrating RRC connection resume (suspended RRC connection or RRC_INACTIVE) or UP-EDT fallback to RRC connection establishment, successful from 3GPP TS36.321 V15.3.0.

FIG. 12 (a Reproduction of FIG. 5.3.3.1-4: RRC Connection Resume (Suspended RRC Connection or RRC_INACTIVE) or UP-EDT Fallback to RRC Connection Establishment, Successful)

Figure 13:
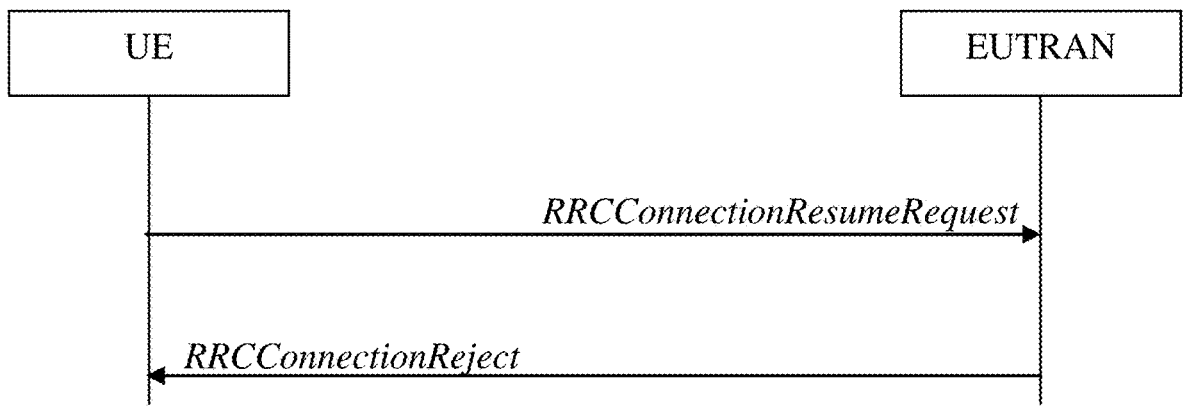
FIG. 13 is a reproduction of FIG. 5.3.3.1-5 illustrating RRC connection resume or UP-EDT, network reject (suspended RRC connection or RRC_INACTIVE) or release (suspended RRC connection) taken from 3GPP TS36.321 V15.3.0.

FIG. 13 (a Reproduction of FIG. 5.3.3.1-5: RRC Connection Resume or UP-EDT, Network Reject (Suspended RRC Connection or RRC_INACTIVE) or Release (Suspended RRC Connection))

Figure 14:
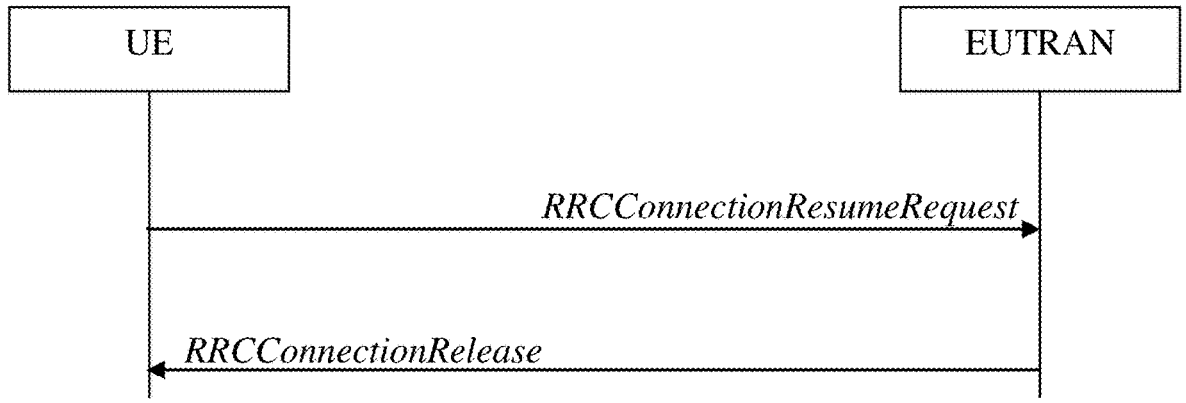
FIG. 14 is a reproduction of FIG. 5.3.3.1-6 illustrating RRC connection resume (RRC_INACTIVE), network release or suspend or UP-EDT, successful taken from 3GPP TS36.321 V15.3.0.

FIG. 14 (a Reproduction of FIG. 5.3.3.1-6: RRC Connection Resume (RRC_INACTIVE), Network Release or Suspend or UP-EDT, Successful)

Figure 15:
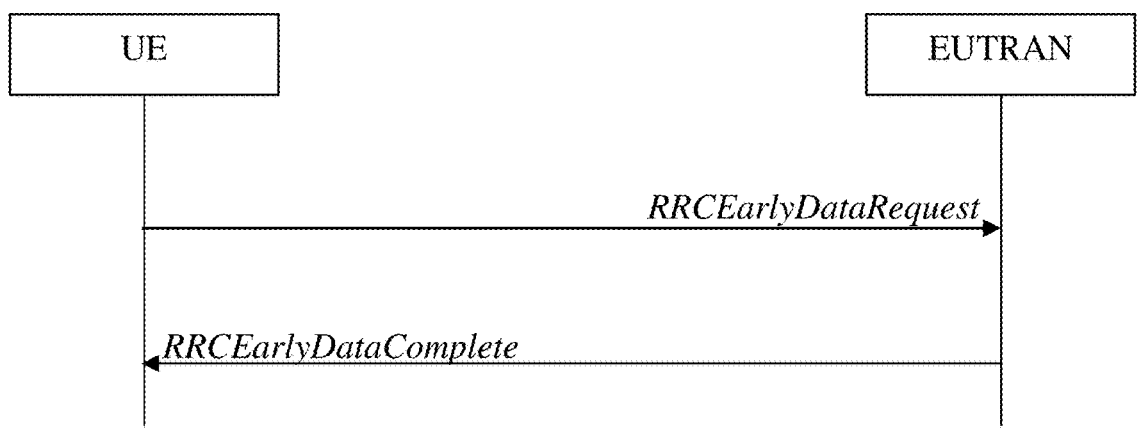
FIG. 15 is a reproduction of FIG. 5.3.3.1-7 CP-EDT, successful taken from 3GPP TS36.321 V15.3.0.

FIG. 15 (a Reproduction of FIG. 5.3.3.1-7: CP-EDT, Successful)

Figure 16:
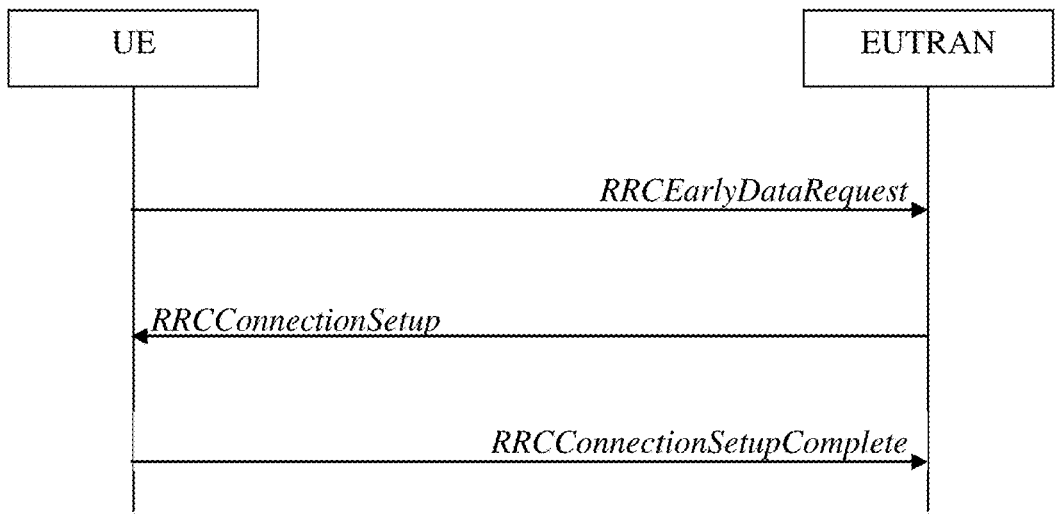
FIG. 16 is a reproduction of FIG. 5.3.3.1-8 illustrating CP-EDT fallback to RRC connection establishment, successful taken from 3GPP TS36.321 V15.3.0.

FIG. 16 (a Reproduction of FIG. 5.3.3.1-8: CP-EDT Fallback to RRC Connection Establishment, Successful)

Figure 17:
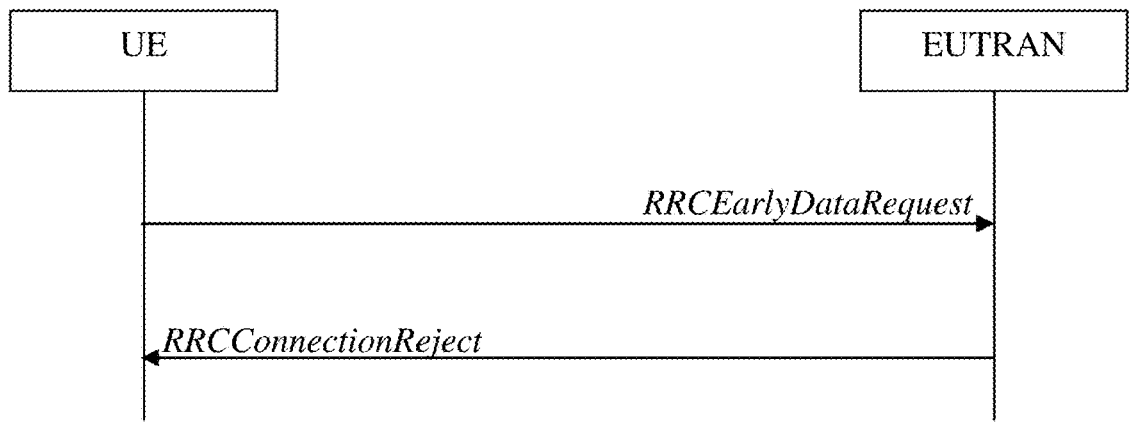
FIG. 17 is a reproduction of FIG. 5.3.3.1-9 illustrating CP-EDT, network reject taken from 3GPP TS36.321 V15.3.0.

FIG. 17 (a Reproduction of FIG. 5.3.3.1-9: CP-EDT, Network Reject)

The purpose of this procedure is to establish an RRC connection, to resume a suspended RRC connection, to move the UE from RRC_INACTIVE to RRC_CONNECTED or to perform EDT. RRC connection establishment involves SRB1 (and SRB1 bis for NB-IoT) establishment. The procedure is also used to transfer the initial NAS dedicated information/message from the UE to E-UTRAN.

E-UTRAN applies the procedure as follows:
   When establishing an RRC connection:
      to establish SRB1 and, for NB-IoT, SRB1 bis;
   When resuming an RRC connection from a suspended RRC connection or from RRC_INACTIVE:
      to restore the AS configuration from a stored context including resuming SRB(s) and DRB(s);
   When performing EDT.

5.3.3.1 b Conditions for Initiating EDT

A BL UE, UE in CE or NB-IoT UE can initiate EDT when all of the following conditions are fulfilled:

1> for CP-EDT, the upper layers request establishment of an RRC connection, the UE supports CP-EDT, and SystemInformationBlockType2 (SystemInformationBlockType2-NB in NB-IoT) includes cp-EDT; or 1> for UP-EDT, the upper layers request resumption of an RRC connection, the UE supports UP-EDT, SystemInformationBlockType2 (SystemInformationBlockType2-NB in NB-IoT) includes up-EDT, and the UE has a stored value of the nextHopChainingCount provided in the RRCConnectionRelease message with suspend indication during the preceding suspend procedure;

1> the establishment or resumption request is for mobile originating calls and the establishment cause is mo-Data or mo-ExceptionData or delayTolerantAccess;

1> SystemInformationBlockType2 (SystemInformationBlockType2-NB in NB-IoT) includes edt-Parameters;

1> the size of the resulting MAC PDU including the total UL data is expected to be smaller than or equal to the TBS signalled in edt-TBS as specified in TS 36.321 [6, 5.1.1];

1> EDT fallback indication has not been received from lower layers for this establishment or resumption procedure;

NOTE 1: Upper layers request or resume an RRC connection. The interaction with NAS is up to UE implementation.

NOTE 2: It is up to UE implementation how the UE determines whether the size of UL data is suitable for EDT.

5.3.3.2 Initiation

The UE initiates the procedure when upper layers request establishment or resume of an RRC connection while the UE is in RRC_IDLE or when upper layers request resume of an RRC connection or RRC layer requests resume of an RRC connection for, e.g. RNAU or reception of RAN paging while the UE is in RRC_INACTIVE.

Except for NB-IoT, upon initiation of the procedure, if the UE is connected to EPC, the UE shall:

1> if SystemInformationBlockType2 includes ac-BarringPerPLMN-List and the ac-BarringPerPLMN-List contains an AC-BarringPerPLMN entry with the plmn-IdentityIndex corresponding to the PLMN selected by upper layers (see TS 23.122 [11], TS 24.301 [35]):
   2> select the AC-BarringPerPLMN entry with the plmn-IdentityIndex corresponding to the PLMN selected by upper layers;
   2> in the remainder of this procedure, use the selected AC-BarringPerPLMN entry (i.e. presence or absence of access barring parameters in this entry) irrespective of the common access barring parameters included in SystemInformationBlockType2;
1> else
   2> in the remainder of this procedure use the common access barring parameters (i.e. presence or absence of these parameters) included in SystemInformationBlockType2;
1> if SystetnInfortnationBlockType2 contains acdc-BarringPerPLMN-List and the acdc-BarringPerPLMN-List contains an ACDC-BarringPerPLMN entry with the pltnn-IdentityIndex corresponding to the PLMN selected by upper layers (see TS 23.122 [11], TS 24.301 [35]):
   2> select the ACDC-BarringPerPLMN entry with the plmn-IdentityIndex corresponding to the PLMN selected by upper layers;
   2> in the remainder of this procedure, use the selected ACDC-BarringPerPLMN entry for ACDC barring check (i.e. presence or absence of access barring parameters in this entry) irrespective of the acdc-BarringForCommon parameters included in SystemInformationBlockType2;
1> else:
   2> in the remainder of this procedure use the acdc-BarringForCommon (i.e. presence or absence of these parameters) included in SystemInformationBlockType2 for ACDC barring check;
1> if upper layers indicate that the RRC connection is subject to EAB (see TS 24.301 [35]):
   2> if the result of the EAB check, as specified in 5.3.3.12, is that access to the cell is barred:
      3> inform upper layers about the failure to establish the RRC connection or failure to resume the RRC connection with suspend indication and that EAB is applicable, upon which the procedure ends;
1> if upper layers indicate that the RRC connection is subject to ACDC (see TS 24.301 [35]), SystemInformationBlockType2 contains BarringPerACDC-CategoryList, and acdc-HPLMNonly indicates that ACDC is applicable for the UE:
   2> if the BarringPerACDC-CategoryList contains a BarringPerACDC-Category entry corresponding to the ACDC category selected by upper layers:
      3> select the BarringPerACDC-Category entry corresponding to the ACDC category selected by upper layers;
   2> else:
      3> select the last BarringPerACDC-Category entry in the BarringPerACDC-CategoryList;
   2> stop timer T308, if running;
   2> perform access barring check as specified in 5.3.3.13, using T308 as "Tbarring" and acdc-BarringConfig in the BarringPerACDC-Category as "ACDC barring parameter";
   2> if access to the cell is barred:
      3> inform upper layers about the failure to establish the RRC connection or failure to resume the RRC connection with suspend indication and that access barring is applicable due to ACDC, upon which the procedure ends;
1> else if the UE is establishing the RRC connection for mobile terminating calls:
   2> if timer T302 is running:
      3> inform upper layers about the failure to establish the RRC connection or failure to resume the RRC connection with suspend indication and that access barring for mobile terminating calls is applicable, upon which the procedure ends;
1> else if the UE is establishing the RRC connection for emergency calls:
   2> if SystemInformationBlockType2 includes the ac-BarringInfo:
      3> if the ac-BarringForEmergency is set to TRUE:
         4> if the UE has one or more Access Classes, as stored on the USIM, with a value in the range 11..15, which is valid for the UE to use according to TS 22.011 [10] and TS 23.122 [11]:
NOTE 1: ACs 12, 13, 14 are only valid for use in the home country and ACs 11, 15 are only valid for use in the HPLMN/ EHPLMN.
            5> if the ac-BarringInfo includes ac-BarringForMO-Data, and for all of these valid Access Classes for the UE, the corresponding bit in the ac-BarringForSpecialAC contained in ac-BarringForMO-Data is set to one:
               6> consider access to the cell as barred;
         4> else:
            5> consider access to the cell as barred;
   2> if access to the cell is barred:
      3> inform upper layers about the failure to establish the RRC connection or failure to resume the RRC connection with suspend indication, upon which the procedure ends;
1> else if the UE is establishing the RRC connection for mobile originating calls:
   2> perform access barring check as specified in 5.3.3.11, using T303 as "Tbarring" and ac-BarringForMO-Data as "AC barring parameter";
   2> if access to the cell is barred:
      3> if SystemInformationBlockType2 includes ac-BarringForCSFB or the UE does not support CS fallback:
         4> inform upper layers about the failure to establish the RRC connection or failure to resume the RRC connection with suspend indication and that access barring for mobile originating calls is applicable, upon which the procedure ends;
      3> else (SystemInformationBlockType2 does not include ac-BarringForCSFB and the UE supports CS fallback):
         4> if timer T306 is not running, start T306 with the timer value of T303;
         4> inform upper layers about the failure to establish the RRC connection or failure to resume the RRC connection with suspend indication and that access barring for mobile originating calls and mobile originating CS fallback is applicable, upon which the procedure ends;
1> else if the UE is establishing the RRC connection for mobile originating signalling:
   2> perform access barring check as specified in 5.3.3.11, using T305 as "Tbarring" and ac-BarringForMO-Signalling as "AC barring parameter";

-continued

2> if access to the cell is barred:
   3> inform upper layers about the failure to establish the RRC connection or failure to resume the RRC connection with suspend indication and that access barring for mobile originating signalling is applicable, upon which the procedure ends;
1> else if the UE is establishing the RRC connection for mobile originating CS fallback:
  2> if SystemInformationBlockType2 includes ac-BarringForCSFB:
   3> perform access barring check as specified in 5.3.3.11, using T306 as "Tbarring" and ac-BarringForCSFB as "AC barring parameter";
   3> if access to the cell is barred:
    4> inform upper layers about the failure to establish the RRC connection or failure to resume the RRC
     connection with suspend indication and that access barring for mobile originating CS fallback is applicable, due to ac-BarringForCSFB, upon which the procedure ends;
  2> else:
   3> perform access barring check as specified in 5.3.3.11, using T306 as "Tbarring" and ac-BarringForMO-Data as "AC barring parameter";
   3> if access to the cell is barred:
    4> if timer T303 is not running, start T303 with the timer value of T306;
    4> inform upper layers about the failure to establish the RRC connection or failure to resume the RRC connection with suspend indication and that access barring for mobile originating CS fallback and mobile originating calls is applicable, due to ac-BarringForMO-Data, upon which the procedure ends;
1> else if the UE is establishing the RRC connection for mobile originating MMTEL voice, mobile originating MMTEL video, mobile originating SMSoIP or mobile originating SMS:
  2> if the UE is establishing the RRC connection for mobile originating MMTEL voice and SystemInformationBlockType2 includes ac-BarringSkipForMMTELVoice; or
  2> if the UE is establishing the RRC connection for mobile originating MMTEL video and SystemInformationBlockType2 includes ac-BarringSkipForMMTELVideo; or
  2> if the UE is establishing the RRC connection for mobile originating SMSoIP or SMS and SystemInformationBlockType2 includes ac-BarringSkipForSMS:
   3> consider access to the cell as not barred;
  2> else:
   3> if establishmentCause received from higher layers is set to mo-Signalling (including the case that mo-Signalling is replaced by highPriorityAccess according to 3GPP TS 24.301 [35] or by mo-VoiceCall according to the subclause 5.3.3.3):
    4> perform access barring check as specified in 5.3.3.11, using T305 as "Tbarring" and ac-BarringForMO-Signalling as "AC barring parameter";
    4> if access to the cell is barred:
     5> inform upper layers about the failure to establish the RRC connection or failure to resume the RRC connection with suspend indication and that access barring for mobile originating signalling is applicable, upon which the procedure ends;
   3> if establishmentCause received from higher layers is set to mo-Data (including the case that mo-Data is replaced by highPriorityAccess according to 3GPP TS 24.301 [35] or by mo-VoiceCall according to the subclause 5.3.3.3):
    4> perform access barring check as specified in 5.3.3.11, using T303 as "Tbarring" and ac-BarringForMO-Data as "AC barring parameter";
    4> if access to the cell is barred:
     5> if SystemInformationBlockType2 includes ac-BarringForCSFB or the UE does not support CS fallback:
      6> inform upper layers about the failure to establish the RRC connection or failure to resume the RRC connection with suspend indication and that access barring for mobile originating calls is applicable, upon which the procedure ends;
     5> else (SystemInformationBlockType2 does not include ac-BarringForCSFB and the UE supports CS fallback):
      6> if timer T306 is not running, start T306 with the timer value of T303;
      6> inform upper layers about the failure to establish the RRC connection or failure to resume the RRC connection with suspend indication and that access barring for mobile originating calls and mobile originating CS fallback is applicable, upon which the procedure ends;
Upon initiation of the procedure, if the UE is connected to 5GC, the UE shall:
1> if the upper layers provide an Access Category and one or more Access Identities upon requesting establishment of an RRC connection:
  2> perform the unified acccess control procedure as specified in 5.3.16 using the Access Category and Access Identities provided by upper layers;
   3> if the access attempt is barred, the procedure ends;
1> if the upper layers provide an Access Category and one or more Access Identities upon requesting the resumption of an RRC connection:
  2> perform the unified acccess control procedure as specified in 5.3.16 using the Access Category and Access Identities provided by upper layers;
   3> if the access attempt is barred, the procedure ends;
1> if the resumption of the RRC connection is triggered due to an RNAU:
  2> if an emergency service is ongoing:
   3> select '2' as the Access Category;
  2> else:
   3> select [the standardised RAN specific access category] as the Access Category;
Editor's Note: Which value to use for the standardised RAN specific access category needs to be confirmed by SA1.
  2> perform the unified acccess control procedure as specified in 5.3.16 using the selected Access Category and one or more Access Identities provided by upper layers;

```
      3> if the access attempt is barred:
         4> set the variable pendingRnaUpdate to 'TRUE';
         4> the procedure ends;
   1> if the resumption of theRRC connection is triggered by response to NG-RAN paging:
      2> select '0' as the Access Category;
      2> perform the unified acccess control procedure as specified in 5.3.16 using the selected Access Category
         and one or more Access Identities provided by upper layers;
         3> if the access attempt is barred, the procedure ends;
Except for NB-IoT, upon initiating the procedure, if connected to EPC or 5GC, the UE shall:
   1> if the UE is resuming an RRC connection from a suspended RRC connection or from RRC_INACTIVE:
      2> if the UE is resuming an RRC connection from a suspended RRC connection:
         3> if the UE was configured with EN-DC:
            4> perform EN-DC release, as specified in TS 38.331 [82,5.3.5.10];
      2> release the MCG SCell(s), if configured, in accordance with 5.3.10.3a;
      2> release powerPrefIndicationConfig, if configured and stop timer T340, if running;
      2> release reportProxitnityConfig and clear any associated proximity status reporting timer;
      2> release obtainLocationConfig, if configured;
      2> release idc-Config, if configured;
      2> release sps-AssistanceInfoReport, if configured;
      2> release measSubframePatternPCell, if configured;
      2> release the entire SCG configuration, if configured, except for the DRB configuration (as configured by
         drb-ToAddModListSCG);
      2> release naics-Info for the PCell, if configured;
      2> release the LWA configuration, if configured, as described in 5.6.14.3;
      2> release the LWIP configuration, if configured, as described in 5.6.17.3;
      2> release bw-PreferenceIndicationTimer, if configured and stop timer T341, if running;
      2> release delayBudgetReportingConfig, if configured and stop timer T342, if running;
      2> release ailc-BitConfig, if configured;
      2> release uplinkData Compression, if configured;
   1> apply the default physical channel configuration as specified in 9.2.4;
   1> apply the default semi-persistent scheduling configuration as specified in 9.2.3;
   1> apply the default MAC main configuration as specified in 9.2.2;
   1> apply the CCCH configuration as specified in 9.1.1.2;
   1> apply the timeAlignmentTimerCommon included in SystemInformationBlockType2;
   1> start timer T300;
   1> if the UE is resuming an RRC connection from a suspended RRC connection or from RRC_INACTIVE:
      2> stop T380 if the UE is resuming from RRC_INACTIVE;
      2> initiate transmission of the RRCConnectionRestaneRequest message in accordance with 5.3.3.3a;
   1> else:
      2> if stored, discard the UE AS context, restaneldentity and I-RNTI;
      2> if the UE is initiating CP-EDT in accordance with conditions in 5.3.3.1b:
         3> initiate transmission of the RRCEarlyDataRequest message in accordance with 5.3.3.3b;
      2> else:
         3> initiate transmission of the RRCConnectionRe quest message in accordance with 5.3.3.3;
   NOTE 2: Upon initiating the connection establishment procedure, the UE is not required to ensure it
   maintains up to date system information applicable only for UEs in RRC_IDLE state or UEs in
   RRC_INACTIVE. However, the UE needs to perform system information acquisition upon cell re-
   selection.
For NB-IoT, upon initiation of the procedure, the UE shall:
   1> if the UE is establishing or resuming the RRC connection for mobile originating exception data; or
   1> if the UE is establishing or resuming the RRC connection for mobile originating data; or
   1> if the UE is establishing or resuming the RRC connection for delay tolerant access; or
   1> if the UE is establishing or resuming the RRC connection for mobile originating signalling;
      2> perform access barring check as specified in 5.3.3.14;
      2> if access to the cell is barred:
         3> inform upper layers about the failure to establish the RRC connection or failure to resume the RRC
            connection with suspend indication and that access barring is applicable, upon which the procedure
            ends;
   1> apply the default physical channel configuration as specified in 9.2.4;
   1> apply the default MAC main configuration as specified in 9.2.2;
   1> apply the CCCH configuration as specified in 9.1.1.2;
   1> start timer T300;
   1> if the UE is establishing an RRC connection:
      2> if the UE is initiating CP-EDT in accordance with conditions in 5.3.3.1b:
         3> initiate transmission of the RRCEarlyDataRequest message in accordance with 5.3.3.3b;
      2> else:
         3> initiate transmission of the RRCConnectionRe quest message in accordance with 5.3.3.3;
   1> else if the UE is resuming an RRC connection:
      2> initiate transmission of the RRCConnectionRestaneRequest message in accordance with 5.3.3.3a;
   NOTE 3: Upon initiating the connection establishment or resumption procedure, the UE is not required to
   ensure it maintains up to date system information applicable only for UEs in RRC_IDLE state.
   However, the UE needs to perform system information acquisition upon cell re-selection.
   NOTE 4: For EDT, upon initiating the connection establishment or resumption procedure, it is up to UE
   implementation whether to continue cell re-selection related measurements as well as cell re-selection
   evaluation and, if the conditions for cell re-selection are fulfilled, whether to perform cell re-selection
   as specified in 5.3.3.5.
```

5.3.3.3a Actions Related to Transmission of RRCConnectionResumeRequest Message

If the UE is resuming the RRC connection from a suspended RRC connection, the UE shall set the contents of RRCConnectionResumeRequest message as follows:
1> if the UE is a NB-IoT UE; or
1> if the UE is initiating UP-EDT in accordance with conditions in 5.3.3.1b; or
1> if field useFullResumeID is signalled in SystemInformationBlockType2:
   2> set the resumeID to the stored resumeIdentity;
1> else:
   2> set the truncatedResumeID to include bits in bit position 9 to 20 and 29 to 40 from the left in the stored resumeIdentity.
1> if the UE supports mo-VoiceCall establishment cause and UE is resuming the RRC connection for mobile originating MMTEL voice and SystemInformationBlockType2 includes voiceServiceCauseIndication and the establishment cause received from upper layers is not set to highPriorityAccess:
   2> set the resumeCause to mo-VoiceCall;
1> else if the UE supports mo-VoiceCall establishment cause for mobile originating MMTEL video and UE is resuming the RRC connection for mobile originating MMTEL video and SysteminformationBlockType2 includes videoServiceCauseIndication and the establishment cause received from upper layers is not set to highPriorityAccess:
   2> set the resumeCause to mo-VoiceCall;
1> else:
   2> set the resumeCause in accordance with the information received from upper layers;
1> set the shortResumeMAC-I to the 16 least significant bits of the MAC-I calculated:
   2> over the ASN.1 encoded as per section 8 (i.e., a multiple of 8 bits) VarShortResumeMAC-Input (or VarShortResumeMAC-Input-NB in NB-IoT);
   2> with the $K_{RRCint}$ key and the previously configured integrity protection algorithm; and
   2> with all input bits for COUNT, BEARER and DIRECTION set to binary ones;
1> if the UE is a NB-IoT UE:
   2> if the UE supports DL channel quality reporting and cqi-Reporting is present in SystemInformationBlockType2-NB:
     3> set the cqi-NPDCCH to include the latest results of the downlink channel quality measurements of the serving cell as specified in TS 36.133 [16];
NOTE 0: The downlink channel quality measurements may use measurement period T1 or T2, as defined in TS 36.133 [16]. In case period T2 is used the RRC-MAC interactions are left to UE implementation.
   2> set earlyContentionResolution to TRUE;
1> restore the RRC configuration and security context from the stored UE AS context;
1> if the UE is initiating UP-EDT in accordance with conditions in 5.3.3.1b:
   2> restore the PDCP state and re-establish PDCP entities for all SRBs and all DRBs;
   2> if drb-ContinueROHC has been provided in immediately preceding RRC connection release message, and the UE is requesting to resume RRC connection in the same cell:
     3> indicate to lower layers that stored UE AS context is used and that drb-ContinueROHC is configured;
     3> continue the header compression protocol context for the DRBs configured with the header compression protocol;
   2> else:
     3> indicate to lower layers that stored UE AS context is used;
     3> reset the header compression protocol context for the DRBs configured with the header compression protocol;
   2> resume all SRBs and all DRBs;
   2> derive the $K_{eNB}$ key based on the $K_{ASME}$ key to which the current $K_{eNB}$ is associated, using the stored value of nextHopChainingCount, as specified in TS 33.401 [32];
   2> derive the $K_{RRCint}$ key associated with the previously configured integrity algorithm, as specified in TS 33.401 [32];
   2> derive the $K_{RRCenc}$ key and the $K_{UPenc}$ key associated with the previously configured ciphering algorithm, as specified in TS 33.401 [32];
   2> configure lower layers to resume integrity protection using the previously configured algorithm and the $K_{RRCint}$ key derived in this subclause to all subsequent messages received and sent by the UE;
   2> configure lower layers to resume ciphering and to apply the ciphering algorithm and the $K_{RRCenc}$ key derived in this subclause to all subsequent messages received and sent by the UE;
   2> configure lower layers to resume ciphering and to apply the ciphering algorithm and the $K_{UPenc}$ key derived in this subclause immediately to the user data sent and received by the UE;
   2> configure the lower layers to use EDT;
1> else:
   2> if SRB1 was configured with NR PDCP:
     3> for SRB1, release the NR PDCP entity and establish an E-UTRA PDCP entity with the current (MCG) security configuration;
NOTE 1: The UE applies the LTE ciphering and integrity protection algorithms that are equivalent to the previously configured NR security algorithms.
   2> else:
     3> for SRB1, restore the PDCP state and re-establish the PDCP entity;
If the UE is resuming the RRC connection from RRC_INACTIVE, the UE shall set the contents of RRCConnectionResumeRequest message as follows:
   2> if field useFullResumeID is signalled in SystemInformationBlockType2:
     3> set the fullI-RNTI to the stored fullI-RNTI value provided in suspend;
   2> else:
     3> set the shortI-RNTI to the stored shortI-RNTI value provided in suspend;
   2> set the resumeCause in accordance with the information received from upper layers or from AS layer;
NOTE 1a: if the resume is triggered by upper layers and AS layer simultaneously, set the resumeCause in accordance with the information received from upper layers.
   2> set the shortResumeMAC-I to the 16 least significant bits of the MAC-I calculated:
     3> over the ASN.1 encoded as per section 8 (i.e., a multiple of 8 bits) VarINACTIVE-MAC-Input;
     3> with the $K_{RRCint}$ key and the previously configured integrity protection algorithm; and
     3> with all input bits for COUNT, BEARER and DIRECTION set to binary ones;

2> restore the RRC configuration and security context from the stored UE AS context except physical layer and MAC configuration;

2> update the $K_{eNB}$ key based on the current $K_{eNB}$ or the NH, using the stored nextHopChainingCount value, as specified in TS 33.501 [86];

2> derive the $K_{RRCenc}$ key, the $K_{RRCint}$ and the $K_{UPenc}$ key;

2> configure lower layers to resume integrity protection for all SRBs except SRB0 using the previously configured algorithm and the $K_{RRCint}$ key immediately, i.e., integrity protection shall be applied to all subsequent messages received and sent by the UE;

2> configure lower layers to resume ciphering for all radio bearers except SRB0 and to apply the previously configured ciphering algorithm, the $K_{RRCenc}$ key and the $K_{UPenc}$ key, i.e. the ciphering configuration shall be applied to all subsequent messages received and sent by the UE;

2> apply the default configuration for SRB1 as specified in 9.2.1.1;

2> apply the default NR PDCP configuration as specified in TS 38.331 [82], clause 9.2.1.1 for SRB1;

Following procedures are applied for both suspended RRC connection and RRC_INACTIVE:

2> resume SRB1;

NOTE 2: Until successful connection resumption, the default physical layer configuration and the default MAC Main configuration are applied for the transmission of SRB0 and SRB1, and SRB1 is used only for the transfer of RRCConnectionResume message.

The UE shall submit the RRCConnectionResumeRequest message to lower layers for transmission.

The UE shall continue cell re-selection related measurements as well as cell re-selection evaluation. If the conditions for cell re-selection are fulfilled, the UE shall perform cell re-selection as specified in 5.3.3.5.

5.3.3.3b Actions Related to Transmission of RRCEarlyDataRequest Message

The UE shall set the contents of RRCEarlyDataRequest message as follows:

1> set the s-TMSI to the value received from upper layers;
1> set the establishmentCause in accordance with the information received from upper layers;
1> if the UE is a NB-IoT UE:
   2> if the UE supports DL channel quality reporting and cqi-Reporting is present in SystemInfortnationBlockType2-NB:
      3> set the cqi-NPDCCH to include the latest results of the downlink channel quality measurements of the serving cell as specified in TS 36.133 [16];
NOTE: The downlink channel quality measurements may use measurement period T1 or T2, as defined in TS 36.133 [16]. In case period T2 is used the RRC-MAC interactions are left to UE implementation.
1> set the dedicatedInfoNAS to include the information received from upper layers;

The UE shall configure the lower layers to use EDT and submit the RRCEarlyDataRequest message to the lower layers for transmission.

5.3.3.3c UE Actions Upon Receiving EDT Fallback Indication from Lower Layers

Upon indication from lower layers that EDT is cancelled, the UE shall:

1> start or restart timer T300;
   1> if the fallback is indicated by lower layers in response to the RRCEarlyDataRequest:
      2> initiate transmission of RRCConnectionRequest message in accordance with 5.3.3.3;
   1> else if the fallback is indicated by lower layers in response to the RRCConnectionResumeRequest for EDT and the fallback is not due to the UL grant provided in Random Access Response not being for EDT:
      2> perform the actions upon abortion of UP-EDT as specified in 5.3.3.9a;
      2> initiate transmission of the RRCConnectionResumeRequest message in accordance with 5.3.3.3a;

5.3.3.4a Reception of the RRCConnectionResume by the UE

The UE shall:

---

1> stop timer T300;
1> except if the RRCConnectionResume is received in response to an RRCConnectionResumeRequest for EDT:
   2> if resuming an RRC connection from a suspended RRC connection:
      3> restore the PDCP state and re-establish PDCP entities for SRB2, if configured with E-UTRA PDCP, and for all DRBs that are configured with E-UTRA PDCP;
      3> if drb-ContinueROHC is included:
         4> indicate to lower layers that stored UE AS context is used and that drb-ContinueROHC is configured;
         4> continue the header compression protocol context for the DRBs configured with the header compression protocol;
      3> else:
         4> indicate to lower layers that stored UE AS context is used;
         4> reset the header compression protocol context for the DRBs configured with the header compression protocol;
      3> discard the stored UE AS context and resumeIdentity;
   2> else if the RRCConnectionResume message includes the fullConfig (for resuming an RRC connection from RRC_INACTIVE):
      3> perform the radio configuration procedure as specified in 5.3.5.8;
   2> else (for resuming an RRC connection from RRC_INACTIVE)
      3> restore the PDCP state, reset COUNT value and re-establish PDCP entities for SRB2 and all DRBs;
      3> restore the physical layer configuration, the MAC configuration, the RLC configuration and the PDCP configuration from the stored UE AS context;
      3> if drb-ContinueROHC is included:
         4> indicate to lower layers that stored UE AS context is used and that drb-ContinueROHC is configured;
         4> continue the header compression protocol context for the DRBs configured with the header compression protocol;

3> else:
      4> indicate to lower layers that stored UE AS context is used;
      4> reset the header compression protocol context for the DRBs configured with the header compression protocol;
   3> discard the stored UE AS context, the fullI-RNTI and the shord-RNTI except ran-NotificationAreaInfo;
1> perform the radio resource configuration procedure in accordance with the received radioResourceConfigDedicated and as specified in 5.3.10;
NOTE: When performing the radio resource configuration procedure, for the physical layer configuration and the MAC Main configuration, the restored RRC configuration from the stored UE AS context is used as basis for the reconfiguration.
1> if the received RRCConnectionRestane message includes the sk-Counter:
   2> perform key update procedure as specified in TS 38.331 [82, 5.3.5.8];
1> if the received RRCConnectionRestane message includes the nr-RadioBearerConfig1:
   2> perform radio bearer configuration as specified in TS 38.331 [82, 5.3.5.6];
1> if the received RRCConnectionRestane message includes the nr-RadioBearerConfig2:
   2> perform radio bearer configuration as specified in TS 38.331 [82, 5.3.5.6];
1> except if the RRCConnectionRestane is received in response to an RRCConnectionRestaneRequest for EDT:
   2> resume SRB2 and all DRBs, if any, including RBs configured with NR PDCP;
1> if stored, discard the cell reselection priority information provided by the idleModeMobilityControlInfo or inherited from another RAT;
1> if stored, discard the dedicated offset provided by the redirectedCarrierOffsetDedicated;
1> if the RRCConnectionRestane message includes the measConfig:
   2> perform the measurement configuration procedure as specified in 5.5.2;
1> stop timer T302, if running;
1> stop timer T303, if running;
1> stop timer T305, if running;
1> stop timer T306, if running;
1> stop timer T308, if running;
1> perform the actions as specified in 5.3.3.7;
1> stop timer T320, if running;
1> stop timer T350, if running;
1> perform the actions as specified in 5.6.12.4;
1> stop timer T360, if running;
1> stop timer T322, if running;
1> if the RRCConnectionRestane is received in response to an RRCConnectionRestaneRequest for EDT:
   2> ignore the nextHopChainingCount value indicated in the RRCConnectionRestane message;
1> else:
   2> if resuming an RRC connection from a suspended RRC connection:
      3> update the $K_{eNB}$ key based on the $K_{ASME}$ key to which the current $K_{eNB}$ is associated, using the nextHopChainingCount value indicated in the RRCConnectionRestane message, as specified in TS 33.401 [32];
      3> store the nextHopChainingCount value;
      3> derive the $K_{RRCint}$ key associated with the previously configured integrity algorithm, as specified in TS 33.401 [32];
      3> request lower layers to verify the integrity protection of the RRCConnectionRestane message, using the previously configured algorithm and the $K_{RRCint}$ key;
   2> if the integrity protection check of the RRCConnectionRestane message fails:
      3> perform the actions upon leaving RRC_CONNECTED or RRC_INACTIVE as specified in 5.3.12, with release cause 'other' for the resume from a suspended RRC connection, with release cause 'RRC Resume failure' for the resume from RRC_INACTIVE, upon which the procedure ends;
   2> if resuming an RRC connection from a suspended RRC connection:
      3> derive the $KRR_{Cenc}$ key and the $K_{UPenc}$ key associated with the previously configured ciphering algorithm, as specified in TS 33.401 [32];
      3> configure lower layers to resume integrity protection using the previously configured algorithm and the $K_{RRCint}$ key immediately, i.e., integrity protection shall be applied to all subsequent messages received and sent by the UE;
      3> configure lower layers to resume ciphering and to apply the ciphering algorithm, the $K_{RRCenc}$ key and the $K_{UPenc}$ key, i.e. the ciphering configuration shall be applied to all subsequent messages received and sent by the UE;
1> enter RRC_CONNECTED;
1> indicate to upper layers that the suspended RRC connection has been resumed;
1> stop the cell re-selection procedure;
1> consider the current cell to be the PCell;
1> set the content of RRCConnectionRestaneComplete message as follows:
   2> set the selectedPLMN-Identity to the PLMN selected by upper layers (see TS 23.122 [11], TS 24.301 [35]) from the PLMN(s) included in the plmn-IdentityList in SystemInformationBlockType1;
   2> set the dedicatedInfoNAS to include the information received from upper layers;
      3> if the UE has flight path information available:
         4> include flightPathInfoAvailable;
   2> except for NB-IoT:
      3> if resuming an RRC connection from a suspended RRC connection:
         4> if the UE has radio link failure or handover failure information available in VarRLF-Report and if the RPLMN is included in plmn-IdentityList stored in VarRLF-Report:
            5> include rlf-InfoAvailable;
         4> if the UE has MBSFN logged measurements available for E-UTRA and if the RPLMN is included in plmn-IdentityList stored in VarLogMeasReport:
            5> include logMeasAvailableMBSFN;

-continued

4> else if the UE has logged measurements available for E-UTRA and if the RPLMN is included in plmn-IdentityList stored in VarLogMeasReport:
        5> include logMeasAvailable;
    4> if the UE has Bluetooth logged measurements available and if the RPLMN is included in plmn-IdentityList stored in VarLogMeasReport:
        5> include logMeasAvailableBT;
    4> if the UE has WLAN logged measurements available and if the RPLMN is included in plmn-IdentityList stored in VarLogMeasReport:
        5> include logMeasAvailableWLAN;
    4> if the UE has connection establishment failure information available in VarConnEstFailReport and if the RPLMN is equal to plmn-Identity stored in VarConnEstFailReport:
        5> include connEstFailInfoAvailable;
    4> include the mobilityState and set it to the mobility state (as specified in TS 36.304 [4]) of the UE just prior to entering RRC_CONNECTED state;
   3> if the UE supports storage of mobility history information and the UE has mobility history information available in VarMobilityHistoryReport:
    4> include mobilityHistoryAvail;
   3> if the SIB2 contains idleModeMeasurements, and the UE has IDLE mode measurement information available in VarMeasIdleReport:
    4> include the idleMeasAvailable;
    4> stop T331 (if running);
  2> for NB-IoT:
   3> if the UE supports serving cell idle mode measurements reporting and servingCellMeasInfo is present in SystemInformationBlockType2-NB:
    4> set the measResultServCell to include the measurements of the serving cell;
NOTE: The UE includes the latest results of the serving cell measurements as used for cell selection/reselection evaluation, which are performed in accordance with the performance requirements as specified in TS 36.133 [16].
1> submit the RRCConnectionResumeComplete message to lower layers for transmission;
1> the procedure ends.

5.3.3.4b Reception of the RRCEarlyDataComplete by the UE

The UE shall:
- 1> if stored, discard the cell reselection priority information provided by the idleModeMobilityControlInfo or inherited from another RAT;
- 1> if stored, discard the dedicated offset provided by the redirectedCarrierOffsetDedicated;
- 1> stop timer T300;
- 1> stop timer T302, if running;
- 1> stop timer T303, if running;
- 1> stop timer T305, if running;
- 1> stop timer T306, if running;
- 1> stop timer T308, if running;
- 1> perform the actions as specified in 5.3.3.7;
- 1> stop timer T320, if running;
- 1> stop timer T322, if running;
- 1> forward the dedicatedInfoNAS, if received, to the upper layers;
- 1> reset MAC and release the MAC configuration;
- 1> if the RRCEarlyDataComplete message includes redirectedCarrierInfo indicating redirection to geran; and
- 1> if upper layers indicate that redirect to GERAN without AS security is not allowed:
  - 2> perform the actions upon leaving RRC_CONNECTED as specified in 5.3.12, with release cause 'other', upon which the procedure ends;
- 1> if the RRCEarlyDataComplete message includes idleModeMobilityControlInfo:
  - 2> store the cell reselection priority information provided by the idleModeMobilityControlInfo;
  - 2> if the t320 is included:
    - 3> start timer T320, with the timer value set according to the value of t320;
- 1> else:
  - 2> apply the cell reselection priority information broadcast in the system information;
- 1> for NB-IoT, if the RRCEarlyDataComplete message includes redirectedCarrierInfo:
  - 2> if the redirectedCarrierOffsetDedicated is included in the redirectedCarrierInfo:
    - 3> store the dedicated offset for the frequency in redirectedCarrierInfo;
    - 3> start timer T322, with the timer value set according to the value of T322 in redirectedCarrierInfo;
- 1> if the extendedWaitTime is present; and
- 1> if the UE supports delay tolerant access or the UE is a NB-IoT UE:
  - 2> forward the extendedWaitTime to upper layers;
- 1> indicate the release of the RRC connection to upper layers together with the release cause 'other', upon which the procedure ends;

5.3.3.8 Reception of the RRCConnectionReject by the UE

The UE shall:
- 1> stop timer T300;
- 1> reset MAC;
- 1> except for NB-IoT, start timer T302, with the timer value set to the waitTime;
- 1> if the UE is a NB-IoT UE; or
- 1> if the extendedWaitTime is present and the UE supports delay tolerant access:
  - 2> forward the extendedWaitTime to upper layers;
- 1> if deprioritisationReq is included and the UE supports RRC Connection Reject with deprioritisation:
  - 2> start or restart timer T325 with the timer value set to the deprioritisationTimer signalled;
  - 2> store the deprioritisationReq until T325 expiry;
- NOTE: The UE stores the deprioritisation request irrespective of any cell reselection absolute priority assignments (by dedicated or common signalling) and regardless of RRC connections in E-UTRAN or other RATs unless specified otherwise.
- 1> if the RRCConnectionReject is received in response to an RRCConnectionResumeRequest sent to resume a suspended RRC connection:

2> if the rrc-SuspendIndication is not present:
   3> release all radio resources, including release of the RLC entity, the MAC configuration and the associated PDCP entity for all established or suspended RBs;
   3> discard the stored UE AS context and resumeIdentity;
   3> inform upper layers about the failure to resume the RRC connection without suspend indication and that access barring for mobile originating calls, mobile originating signalling, mobile terminating access and except for NB-IoT for mobile originating CS fallback is applicable, upon which the procedure ends;
2> else:
   3> if the RRCConnectionReject is received in response to an RRCConnectionResumeRequest for EDT:
      4> perform the actions upon abortion of UP-EDT as specified in 5.3.3.9a;
   3> else:
      4> suspend SRB1;
   3> inform upper layers about the failure to resume the RRC connection with suspend indication and that access barring for mobile originating calls, mobile originating signalling, mobile terminating access and except for NB-IoT for mobile originating CS fallback is applicable, upon which the procedure ends;
1> else if the RRCConnectionReject is received in response to an RRCConnectionResumeRequest sent while in RRC_INACTIVE:
   2> set the variable pendingRnaUpdate to FALSE;
   2> if RRCConnectionReject is received in response to a request from upper layers:
      3> inform the upper layer that access barring is applicable for all access categories except categories '0' and '2';
   2> if RRCConnectionReject is received in response to an RRCConnectionResumeRequest:
      3> if resume is triggered by upper layers:
         4> inform upper layers about the failure to resume the RRC connection;
      3> if resume is triggered by RRC:
         4> set the variable pendingRnaUpdate to 'TRUE';
      3> discard the security context including the $K_{RRCenc}$ key, the $K_{RRCint}$ the $K_{UPint}$ key and the $K_{UPenc}$ key;
      3> suspend SRB1, upon which the procedure ends;
Editor's note: 'FS Handling of timer T380 upon Reject e.g. stop, re-start, etc.
   2> The UE shall continue to monitor RAN and CN paging while the timer T302 is running.
1> else:
   2> release the MAC configuration;
   2> inform upper layers about the failure to establish the RRC connection and that access barring for mobile originating calls, mobile originating signalling, mobile terminating access and except for NB-IoT, for mobile originating CS fallback is applicable, upon which the procedure ends;

5.3.3.9a Abortion of UP-EDT
The UE shall:
1> delete the $K_{eNB}$, $K_{RRCint}$, $K_{RRCenc}$ and $K_{UPenc}$ keys derived in accordance with 5.3.3.3a;
1> re-establish RLC entities for all SRBs and DRBs;
1> suspend all SRB(s) and DRB(s) except SRB0;
1> configure lower layers to suspend integrity protection and ciphering.

5.3.3.16 Integrity Check Failure from Lower Layers while T300 is Running for UP-EDT
The UE shall:
1> upon receiving integrity check failure indication from lower layers concerning SRB1 or SRB2 while T300 is running for UP-EDT:
   2> discard the stored UE AS context and resumeIdentity;
   2> perform the actions upon leaving RRC_CONNECTED as specified in 5.3.12, with release cause 'other';

5.3.8.3 Reception of the RRCConnectionRelease by the UE
The UE shall:
1> except for NB-IoT, BL UEs or UEs in CE, delay the following actions defined in this sub-clause 60 ms from the moment the RRCConnectionRelease message was received or optionally when lower layers indicate that the receipt of the RRCConnectionRelease message has been successfully acknowledged, whichever is earlier;
1> for BL UEs or UEs in CE, delay the following actions defined in this sub-clause 1.25 seconds from the moment the RRCConnectionRelease message was received or optionally when lower layers indicate that the receipt of the RRCConnectionRelease message has been successfully acknowledged, whichever is earlier;
1> for NB-IoT, delay the following actions defined in this sub-clause 10 seconds from the moment the RRCConnectionRelease message was received or optionally when lower layers indicate that the receipt of the RRCConnectionRelease message has been successfully acknowledged, whichever is earlier.
NOTE: For BL UEs, UEs in CE and NB-IoT, when STATUS reporting, as defined in TS 36.322 [7], has not been triggered and the UE has sent positive HARQ feedback (ACK), as defined in TS 36.321 [6], the lower layers can be considered to have indicated that the receipt of the RRCConnectionRelease message has been successfully acknowledged.
1> if the RRCConnectionRelease message is received in response to an RRCConnectionResumeRequest for EDT:
   2> discard the stored UE AS context and resumeIdentity;
   2> stop timer T300;
   2> stop timer T302, if running;
   2> stop timer T303, if running;
   2> stop timer T305, if running;
   2> stop timer T306, if running;
   2> stop timer T308, if running;
   2> perform the actions as specified in 5.3.3.7;
   2> stop timer T320, if running;
   2> stop timer T322, if running;
1> if the RRCConnectionRelease message includes redirectedCarrierInfo indicating redirection to geran; or
1> if the RRCConnectionRelease message includes idleModeMobilityControlInfo including freqPriorityListGERAN:
   2> if AS security has not been activated; and
   2> if upper layers indicate that redirect to GERAN without AS security is not allowed or if the UE is connected to SGC:
      3> ignore the content of the RRCConnectionRelease;

3> perform the actions upon leaving RRC_CON-
   NECTED or RRC_INACTIVE as specified in
   5.3.12, with release cause 'other', upon which the
   procedure ends;
1> if AS security has not been activated:
   2> ignore the content of redirectedCarrierInfo, if
      included and indicating redirection to nr;
   2> ignore the content of idleModeMobilityControlInfo,
      if included and including freqPriorityListNR;
   2> if the UE ignores the content of redirectedCarrier-
      Info or of idleModeMobilityControlInfo:
      3> perform the actions upon leaving RRC_CON-
         NECTED as specified in 5.3.12, with release
         cause 'other', upon which the procedure ends;
1> if the RRCConnectionRelease message includes redi-
   rectedCarrierInfo indicating redirection to eutra and if
   UE is connected to 5GC:
   2> if cn-Type is included:
      3> the received cn-Type is provided to upper layers;
NOTE 1: Handling the case if the E-UTRA cell selected
after the redirection does not support the core network
type specified by the cn-Type, is up to UE implemen-
tation.
1> if the RRCConnectionRelease message includes the
   idleModeMobilityControlInfo:
   2> store the cell reselection priority information pro-
      vided by the idleModeMobilityControlInfo;
   2> if the t320 is included:
      3> start timer T320, with the timer value set accord-
         ing to the value of t320;
1> else:
   2> apply the cell reselection priority information
      broadcast in the system information;
1> if the RRCConnectionRelease message includes the
   measIdleConfig:
   2> clear VarMeasIdleConfig and VarMeasIdleReport;
   2> store the received measIdleDuration in VarMeasI-
      dleReport;
   2> start T331 with the value of measIdleDuration;
   2> if the measIdleConfig contains measIdleCarrierLis-
      tEUTRA:
      3> store the received measIdleCarrierListEUTRA in
         VarMeasIdleConfig;
   2> else:
      3> store the measIdleCarrierListEUTRA received in
         SIB5 in VarMeasIdleConfig;
   2> start performing idle mode measurements as speci-
      fied in 5.6.20;
1> for NB-IoT, if the RRCConnectionRelease message
   includes the redirectedCarrierInfo:
   2> if the redirectedCarrierOffsetDedicated is included
      in the redirectedCarrierInfo:
      3> store the dedicated offset for the frequency in
         redirectedCarrierInfo;
      3> start timer T322, with the timer value set accord-
         ing to the value of T322 in redirectedCarrierInfo;
1> if the releaseCause received in the RRCConnection-
   Release message indicates loadBalancingTAURe-
   quired:
   2> perform the actions upon leaving RRC_CON-
      NECTED as specified in 5.3.12, with release cause
      'load balancing TAU required';
1> else if the releaseCause received in the RRCConnec-
   tionRelease message indicates cs-FallbackHighPrior-
   ity:
   2> perform the actions upon leaving RRC_CON-
      NECTED as specified in 5.3.12, with release cause
      'CS Fallback High Priority';
1> else:
   2> if the extendedWaitTime is present; and
   2> if the UE supports delay tolerant access or the UE
      is a NB-IoT UE:
      3> forward the extendedWaitTime to upper layers;
   2> if the extended WaitTime-CPdata is present and the
      NB-IoT UE only supports the Control Plane CIoT
      EPS optimisation:
      3> forward the extended WaitTime-CPdata to upper
         layers;
   2> if the release Cause received in the RRCConnec-
      tionRelease message indicates rrc-Suspend:
      3> if rrc-InactiveConfig is included:
         4> perform the actions upon entering RRC_I-
            NACTIVE as specified in 5.3.8.7;
      3> else:
         4> perform the actions upon leaving RRC_CON-
            NECTED as specified in 5.3.12, with release
            cause 'RRC suspension';
   2> else:
      3> perform the actions upon leaving RRC_CON-
         NECTED or RRC_INACTIVE as specified in
         5.3.12, with release cause 'other';

Transmission in preconfigured uplink resources (PUR) is discussed in 3GPP RAN1. Some agreements made by RAN1 are quoted below from 3GPP RAN1 #94 Chairman's Note, 3GPP RAN1 #94bis Chairman's Note, 3GPP RAN1 #95 Chairman's Note. 3GPP RAN1 #94 Chairman's Note provides the following: Agreement Idle mode based pre-configured UL resources is supported for UEs in possession of a valid TA FFS: Validation mechanism for TA
FFS: How the pre-configured UL resources is acquired
Agreement
For transmission in preconfigured UL resources, the UE may use the latest TA of which its validity can be confirmed
Agreement
Study both shared and dedicated resource for preconfigured UL resources. If both shared and dedicated resources are supported, strive for commonality in design of both resource types.
Agreement
HARQ procedures for transmission in preconfigured UL resources should be studied and the following aspects should be considered:
   Whether to support HARQ;
      If supported, details of HARQ design including the number of HARQ processes;
   Whether ACK/NACK is necessary
Fallback mechanisms should be considered, e.g. fallback to legacy RACH/EDT procedures.
3GPP RAN1 #94bis Chairman's Note provides the following:
Agreement
In idle mode, the UE will at least consider one or more of the following attributes when validating TA (combination of multiple attributes is allowed):
   Serving cell changes (serving cell refers the cell that the UE is camping on)
   Time Alignment Timer for idle mode
   Serving cell RSRP changes (serving cell refers the cell that the UE is camping on)

FFS Other attributes:
  Neighbour cell RSRP change
  TDOA of >=2 eNBs
  TA History
  Subscription based UE differentiation
  Others not precluded (for example, attributes that need to be considered for high mobility UEs)
Note that UE power consumption should be taken into account for the FFS attributes
Agreement
Dedicated preconfigured UL resource is defined as an PUSCH resource used by a single UE
  PUSCH resource is time-frequency resource
  Dedicated PUR is contention-free
Contention-free shared preconfigured UL resource (CFS PUR) is defined as an PUSCH resource simultaneously used by more than one UE
  PUSCH resource is at least time-frequency resource
  CFS PUR is contention-free
Contention-based shared preconfigured UL resource (CBS PUR) is defined as an PUSCH resource simultaneously used by more than one UE
  PUSCH resource is at least time-frequency resource
  CBS PUR is contention-based (CBS PUR may require contention resolution)
Agreement
In IDLE mode, HARQ is supported for transmission in dedicated PUR
  A single HARQ process is supported,
    FFS whether more than one HARQ processes are supported
  FFS: The design of the corresponding MPDCCH search space
Agreement
In idle mode, dedicated PUR is supported.
  Support for CFS PUR is FFS.
  Support for CBS PUR is FFS.
Agreement
For UL transmission in preconfigured resource, fallback mechanism to RACH/EDT procedures is supported.
Agreement
For transmission in preconfigured UL resources, an RRC idle UE may use the latest TA that passed the validation criteria
Agreement
Pre-configured UL resources for transmission of data are indicated by RRC signaling. At least UE-specific RRC signaling is supported.
Agreement
The resource configuration includes at least the following
  Time domain resources including periodicity(s)
  Frequency domain resources
  TBS(s)/MCS(s)
Agreement
Dedicated preconfigured UL resource is defined as an NPUSCH resource used by a single UE
  NPUSCH resource is time-frequency resource
  Dedicated PUR is contention-free
Contention-free shared preconfigured UL resource (CFS PUR) is defined as an NPUSCH resource simultaneously used by more than one UE
  NPUSCH resource is at least time-frequency resource
  CFS PUR is contention-free
Contention-based shared preconfigured UL resource (CBS PUR) is defined as an NPUSCH resource simultaneously used by more than one UE
  NPUSCH resource is at least time-frequency resource
  CBS PUR is contention-based (CBS PUR may require contention resolution)
3GPP RAN1 #95 Chairman's Note provides the following:
Additional MTC Enhancements
Agreement
For dedicated PUR in idle mode, the UE may skip UL transmissions.
  FFS: Resource release mechanism
  FFS: Whether or not to support mechanism to disable skipping by eNB
Agreement
If multi-TB grant is not enabled, a dedicated PUR allocation is associated to only a single TB and single HARQ process
  FFS: if multi-TB grant is enabled/supported
Agreement
In idle mode, at least the following TA validation attributes are supported:
  Serving cell changes (serving cell refers the cell that the UE is camping on)
  Time Alignment Timer for idle mode
  Serving cell RSRP changes (serving cell refers the cell that the UE is camping on)
  Based on RSRP measurement definition in existing Rel-15 TS36.214
Include in LS to RAN2, RAN4 to consider in their work.
Agreement
The UE can be configured to use at least these TA validation attributes:
  Time Alignment Timer for idle mode
  Serving cell RSRP changes
  Note: the configuration shall support disabling of the TA validation attributes
Include in LS to RAN2, RAN4
For Further Study:
TA validation attributes:
  Subscription based UE differentiation (or Stationary indication in held in subscription)
  Cell specific indication where TA is valid within that cell
Agreement
Include in LS to RAN2, RAN4:
RAN1 assumes that a UE transitioning from EDT/connected to idle mode can use the valid TA that was used while in EDT/connected mode.
Agreement
For dedicated PUR in idle mode, UL grant for HARQ retransmission is transmitted in MPDCCH search space
  FFS: Details on the search space (for example USS, CSS)
Agreement
For dedicated PUR in idle mode, upon successful decoding by eNB of a PUR transmission, the UE can expect an explicit ACK
FFS: if ACK is sent on MPDCCH (layer 1) and/or PDSCH (layer 2/3)
Include in LS to RAN2, RAN4.
Agreement
For dedicated PUR in idle mode, upon unsuccessful decoding by eNB of a PUR transmission, the UE can expect
  an UL GRANT for retransmission on the MPDCCH, or
  FFS: a NACK, or
  FFS: no explicit ACK
Include in LS to RAN2, RAN4.
Additional Enhancements for NB-IoT
Agreement
In idle mode, at least the following TA validation attributes are supported:

Serving cell changes (serving cell refers the cell that the UE is camping on)
Time Alignment Timer for idle mode
Serving cell NRSRP changes (serving cell refers the cell that the UE is camping on)
  Based on NRSRP measurement definition in existing Rel-15 TS36.214
Send LS to RAN2, RAN4 to consider in their work. All the agreements with 'include in LS to RAN2, RAN4' for NB-IoT and eMTC should be captured in this LS. The LS is endorsed in R1-1813778
Agreement
The UE can be configured to use at least these TA validation attributes:
  Time Alignment Timer for idle mode
  Serving cell NRSRP changes
  Note: the configuration shall support disabling of the TA validation attributes
Include in LS to RAN2, RAN4.
For Further Study:
TA validation attributes:
  Subscription based UE differentiation (or Stationary indication in held in subscription)
  Cell specific indication where TA is valid within that cell
Agreement
Include in LS to RAN2, RAN4:
RAN1 assumes that a UE transitioning from EDT/connected to idle mode can use the valid TA that was used while in EDT/connected mode.
Agreement
For dedicated PUR in idle mode, the UE may skip UL transmissions.
  FFS: Resource release mechanism
  FFS: Whether or not to support mechanism to disable skipping by eNB
Agreement
In idle mode, only one HARQ process is supported for dedicated PUR
Agreement
For dedicated PUR in idle mode, UL grant for HARQ retransmission is transmitted in search space
  FFS: Details on the search space (for example USS, CSS)
In the following paragraphs, "Machine-Type Communications (MTC) UEs" could include "Bandwidth reduced and Low complexity (BL) UEs" and/or "UEs in enhanced coverage (UEs in EC, UEs in CE)".

In LTE Release 15, in order to improve transmission efficiency and reduce power consumption for MTC UEs and NB-IoT UEs, Early Data Transmission (EDT) is introduced. An EDT could be applicable for MTC UEs and Narrow Band Internet of Things (NB-IoT) UEs. An EDT could be triggered in a RRC_IDLE state. After an EDT is triggered, the Uplink (UL) user data (e.g., Mobile Originated data) is included in Msg3 during a Random Access procedure, and the Network (NW) may include downlink (DL) user data in Msg4 during the Random Access procedure. One benefit of an EDT is that the uplink (UL) user data could be transmitted without the need of entering a RRC_CONNECTED state. It is also possible that the EDT falls back to the legacy RRC connection establishment/resume procedure, and the UL user data may be transmitted after the UE enters RRC_CONNECTED state.
  There are two types of EDT:
  CP-EDT (EDT for Control Plane CIoT EPS optimizations)
    UL user data is transmitted in a NAS message concatenated in UL RRCEarlyDataRequest message on the Common Control Channel (CCCH). RRCEarlyDataRequest is included in Msg3 during a Random Access procedure.
    Downlink (DL) user data may be optionally transmitted in a non-access stratum (NAS) message concatenated in DL RRCEarlyDataComplete message on CCCH. RRCEarlyDataComplete is included in Msg4 during the Random Access procedure.
    If the Mobility Management Entity (MME) or the evolved Node B (eNB) decides to move the UE to RRC_CONNECTED mode, RRCConnectionSetup message is sent in Msg4 to fall back to the legacy RRC Connection establishment procedure.
  UP-EDT (EDT for User Plane CIoT EPS optimizations)
    UL user data is transmitted on a Dedicated Traffic Channel (DTCH) multiplexed with a UL RRCConnectionResumeRequest message on CCCH. In this case, both the DTCH Service Data Unit (SDU) and CCCH SDU are included in Msg3 during a Random Access procedure.
    DL user data may be optionally transmitted on a DTCH multiplexed with DL RRCConnectionRelease message on a Dedicated Control Channel (DCCH). In this case, both the DTCH SDU and DCCH SDU are included in Msg4 during the Random Access procedure.
    If the MME or eNB decides to move the UE to RRC_CONNECTED mode, RRCConnectionResume message (and optionally DL user data) is sent in Msg4 to fall back to the RRC Connection resume procedure.

In LTE Release 16, in order to further improve transmission efficiency and reduce power consumption for MTC UEs and NB-IoT UEs, transmission(s) in preconfigured uplink (UL) resources (PUR) will be introduced and is currently under discussion. According to RAN1 agreements, the UE could use dedicated (i.e., not shared among multiple UEs) PUR in RRC_IDLE state if some criteria are met. The criteria at least includes a valid Time Alignment (TA). The validation mechanism for a TA is still under discussion and may include, for example, a TA Timer for the idle mode. The UE may consider its TA valid if the TA Timer is running. Hybrid Automatic Repeat Request (HARQ) is supported for transmission(s) using a dedicated PUR to improve reliability, but the details are still under discussion. In addition, the fallback mechanism to Random Access Channel (RACH)/EDT procedures is also supported, but the details are still under discussion. In the following paragraphs, the "UEs" could include MTC UEs and/or NB-IoT UEs.

It is still unclear how transmission(s) using PUR is modeled on the UE side. It is possible that the configuration of PUR may be provided in a dedicated signaling to the UE when the UE is in a RRC connected mode (or RRC_CONNECTED state). The configured PUR may be valid when the UE is in a RRC idle mode (or RRC_IDLE state). The configured PUR may not require a lower layer activation. The UE may not use the configured PUR if no data is available for transmission. The UE may skip a transmission using PUR if no data is available for transmission. The UE may not generate a Medium Access Control (MAC) Protocol Data Unit (PDU) for transmission using PUR if no data is available for transmission. For a dedicated PUR, because the NW can identify which UE is performing a transmission using PUR, contention resolution is not needed. This may include two steps: (i) the transmission using PUR, and (2) reception of the NW response. The NW response could be an acknowledgement of whether the transmission has been received successfully, e.g., a HARQ feedback or an indication in a paging message. The NW response could be a dynamic UL grant for retransmission. The NW response could be a DL user data and/or a Radio Resource Control (RRC) message, e.g., RRC Early Data Complete message. The DL user data and/or RRC message could be scheduled by a dynamic DL assignment. The dynamic DL assignment could be addressed to a specific Radio Network Temporary Identifier (RNTI) (e.g., Cell-RNTI (C-RNTI) (of the UE when the UE was last time in RRC_CONNECTED), Temporary C-RNTI, or a new RNTI). The specific RNTI could be provided in the dedicated PUR configuration. The specific RNTI could be provided when the UE is in RRC_CONNECTED state. The DL user data and/or RRC message could be scheduled by a paging message dedicated to the UE. The DL user data and/or RRC message could be carried in a paging message (dedicated) for the UE. If retransmission is required, the UE may perform retransmission in the next PUR occasion or based on a dynamic UL grant received in the second step (in case dynamic UL grant in IDLE mode is supported).

The NW may configure a UE with different sets of PUR configurations in order to facilitate different radio conditions in the same Serving Cell. For example, each set of PUR configurations is configured per enhanced coverage level (EC level). A PUR attempt may be the UE transmitting a MAC PDU on a PUR occasion. The PUR occasion may be pre-configured in a PUR configuration or may be provided in a dynamic UL grant. The UE may consider one PUR attempt as failed if a dynamic UL grant for retransmission is received in response to the PUR attempt. The UE may consider one PUR attempt as failing if nothing is received within a time period in response to the PUR attempt.

A UE should be provided with at least a (set of) PUR configuration before it performs a transmission using PUR. A (set of) PUR configuration may include at least one of the following parameters: transport block size(s) (TB size); Modulation and Coding scheme(s) (MCS); time domain periodicity in units of hours, seconds, Hyper Frame Numbers (HFNs), System Frame Numbers (SFNs), subframes, slots, symbols; time domain offset in units of hours, seconds, HFNs, SFNs, subframes, slots, symbols; frequency domain location/offset; threshold (e.g., Reference Signal Received Power (RSRP) threshold); (maximum) number of repetitions for each attempt of the transmission using PUR; transmission power (Tx power) for each attempt of the transmission using PUR; or power ramping step. Some of the aforementioned parameters may have different values for different sets of PUR configurations. Some of the aforementioned parameters may not be included in the sets of PUR configurations and are shared between multiple sets of PUR configurations. For example, the time domain periodicity may be shared, and the (maximum) number of repetitions is not shared. In another example, the TB size(s) is shared, and the Tx power is not shared.

In response to the occurrence of one or some of the following events (each event may be independent from each other), whether the UE needs to release its (dedicated and/or shared) set(s) of PUR configuration(s) should be considered:

Enter RRC_CONNECTED

The UE could release (all of) its PUR configuration(s) in response to enter RRC_CONNECTED. The UE could release (all of) its PUR configuration(s) when entering of RRC_CONNECTED. Alternatively, the UE could keep (or maintain or store) (all of) its PUR configuration(s) in response to enter RRC_CONNECTED.

In addition to keeping (all of) the PUR configuration(s), the UE may suspend using (all of) its PUR configuration(s) when the UE is in RRC_CONNECTED state. In other words, the UE keeps (all of) the PUR configuration(s) when using the PUR configuration(s) is suspended. Suspension of a PUR configuration or a set of PUR configurations could mean that the UE does not perform a transmission using a PUR associated with the PUR configuration or the set of PUR configurations. The UE could resume using (all of) the PUR configuration(s) when the UE enters the RRC_IDLE state again.

The UE could enter RRC_CONNECTED by a RRC connection establishment procedure. For example, the UE enters RRC_CONNECTED upon reception of a RRCConnectionSetup message. Alternatively, the UE could enter RRC_CONNECTED by a RRC connection resume procedure. For example, the UE enters RRC_CONNECTED upon the reception of a RRCConnectionResume message.

For example, in response to the reception of a RRCConnectionSetup message, the UE could autonomously release (all) its PUR configuration(s).

In an alternative example, in response to the reception of a RRCConnectionSetup message, the UE does not autonomously release (all) its PUR configuration(s).

An explicit indication in the RRCConnectionSetup message to tell the UE to release its PUR configuration(s) may not be needed. Alternatively, an indication could be included in the RRCConnectionSetup message to tell the UE whether to release (all) PUR configuration(s).

For example, in response to the reception of a RRCConnectionResume message, the UE could autonomously release (all) its PUR configuration(s).

In an alternative example, in response to the reception of a RRCConnectionResume message, the UE does not autonomously release (all) its PUR configuration(s).

An explicit indication in the RRCConnectionResume message to tell the UE to release PUR configuration(s) may not be needed. Alternatively, an indication could be included in the RRCConnectionResume message to tell the UE whether to release (all) PUR configuration(s).

For example, an indication could be included in a RRCConnectionRelease message to tell the UE whether to release (all) PUR configuration(s).

For example, in response to the transmission of a RRCConnectionSetupComplete message, the UE could autonomously release (all) its PUR configuration(s).

For example, in response to the transmission of a RRCConnectionResumeComplete message, the UE could autonomously release (all) its PUR configuration(s).

The (set of) PUR configuration in use is changed

The UE may switch or change the (set of) PUR configurations currently in use. For example, a first set of PUR configuration is associated with a first EC level and a second set of PUR configuration is associated with a second EC level. When the current EC level is changed from the first EC level to the second EC level, the set of PUR configuration in use is changed from the first set to the second set. In another example, the NW could send a message including an indication to the UE in which the indication indicates that the UE should change the EC level and/or change the (set of) PUR configurations from the first set to the second set. The NW may send the message in response to a successful reception of a PUR attempt from the UE. The NW may send the message in response to an unsuccessful reception of a PUR attempt from the UE.

In response to changing/switching the set of PUR configuration, the UE could release the first set of PUR configurations. Alternatively, in response to changing/switching the set of PUR configurations, the UE could suspend the first set of PUR configurations. Alternatively, in response to changing/switching the set of PUR configurations, the UE could keep the first set of PUR configuration.

Changing PUR configurations may be due to one PUR attempt failing in the first EC level. Alternatively, changing PUR configurations may be due to the maximum number of PUR attempts has been reached in the first EC level. Alternatively, changing PUR configurations may be due to one PUR attempt using the first set of PUR configuration fails. Alternatively, changing PUR configurations may be due to the maximum number of PUR attempts using the first set of PUR configuration has been reached. Alternatively, changing PUR configurations may be due to the latest measured RSRP falling within the RSRP range for the second EC level. Alternatively, changing PUR configurations may be due to the latest measured RSRP falling within the RSRP range for the second set of PUR configuration. Alternatively, changing PUR configurations may be due to the NW indication as described above.

In addition to keeping the first set of PUR configuration, the UE may suspend the use of the first set of PUR configuration. Suspension of a set of PUR configuration could mean that the UE does not perform a transmission using the PUR associated with the set of PUR configurations. The UE could resume using the first set of PUR configuration when the current EC level is changed to the first EC level again.

Uplink Time Alignment (TA) becomes invalid (e.g., Timing Advance Timer (TAT) expires, Serving Cell changes)

The UE could release a PUR configuration or a set of PUR configurations in response to the TA associated with the PUR configuration or the set of PUR configurations becoming invalid. Alternatively, the UE could keep the PUR configuration or the set of PUR configurations in response to the TA associated with the PUR configuration or the set of PUR configurations becoming invalid.

For example, if the TA for PUR becomes invalid during one PUR attempt, the UE autonomously releases (all) its PUR configuration(s). In another example, if the TA for PUR becomes invalid while there is no ongoing PUR, the UE autonomously releases (all) its PUR configuration(s). Alternatively, if the TA for PUR becomes invalid during one PUR attempt and/or while there is no ongoing PUR, the UE keeps (all) its PUR configuration(s).

The TA associated with a set of PUR configuration may become invalid because the TA timer associated with the set of PUR configuration expires. The TA associated with a set of PUR configuration may become invalid because the UE camps on a Cell not associated with the set of PUR configurations. The TA associated with a set of PUR configurations may become invalid due to a radio condition (e.g., RSRP) of camped-on cell changes, e.g. worse than a threshold for (or in) the set of PUR configurations. The TA associated with a set of PUR configurations may become invalid due to the UE becoming out-of-coverage.

Combinations of the above examples are possible. For example, the UE keeps (all) its PUR configuration(s) if the TA for PUR becomes invalid due to TA timer for PUR expires, and the UE autonomously releases (all) its PUR configuration(s) if TA for PUR becomes invalid due to Serving Cell changes.

In addition to keeping the set of PUR configurations, the UE may suspend using the set of PUR configurations. Suspension of a set of PUR configuration could mean that the UE does not perform a transmission using PUR associated with the set of PUR configurations. The UE could resume using the set of PUR configurations when the TA associated with the set of PUR configurations becomes valid again.

RA procedure is initiated

The UE could release (all) its PUR configuration(s) in response to the initiation of a RA procedure, e.g., when the UE is in RRC_IDLE. Alternatively, the UE could suspend (all) its PUR configuration(s) in response to the initiation of a RA procedure, e.g., when the UE is in RRC_IDLE. Alternatively, the UE could keep (all) its PUR configuration(s) in response to initiation of a RA procedure, e.g., when the UE is in RRC_IDLE.

The RA procedure could be for an EDT. Alternatively, the RA procedure is not for an EDT.

The UE may determine whether to release or to keep (all) its PUR configuration(s) based on whether the RA procedure is for an EDT or not for EDT. For example, if the RA procedure is for an EDT, the UE could keep (all) its PUR configuration(s) in response to the initiation of the RA procedure. If the RA procedure is not for EDT, the UE could release (all) its PUR configuration(s) in response to the initiation of the RA procedure.

For example, when a RA procedure is initiated, but there is an ongoing PUR (e.g., the RA is triggered due to the condition(s) of using PUR not being satisfied), the UE autonomously releases (all) its PUR configuration(s). Alternatively, when a RA procedure is initiated, but there is an ongoing PUR (e.g., the RA is triggered due to the condition(s) of using PUR not being satisfied), the UE keeps (all) its PUR configuration(s).

In addition to keeping (all) the PUR configuration(s), the UE may suspend using (all) the PUR configuration(s). Suspension of a set of PUR configuration could mean that the UE does not perform a transmission using PUR associated with the set of PUR configuration. The UE could resume using the set of PUR configuration in response to (successful) completion of the RA procedure.

RRC connection release or RRC early data complete is received in response to transmission using PUR For the successful completion of EDT, the NW includes a RRCConnectionRelease or RRCEarlyDataComplete message in the Msg4 of the RA procedure for EDT. If PUR is used for EDT, the NW may also include a RRCConnectionRelease or RRCEarlyDataComplete message in the NW response for PUR in order to indicate the successful completion of the EDT. The UE may determine whether to release or to keep set(s) of the PUR configuration(s) upon the reception of the message. Alternatively, there could be an indication in the message, and the UE determines whether to release or to keep set(s) of PUR configuration(s) based on the indication.

For example, when the UE receives a RRCConnectionRelease message in response to a transmission of a RRCConnectionResumeRequest message using PUR, the UE autonomously releases (all) its PUR configuration(s). Alternatively, when the UE receives a RRCConnectionRelease message in response to a transmission of a RRCConnectionResumeRequest message using PUR, the UE keeps (all) its PUR configuration(s).

For example, when the UE receives a RRCEarlyDataComplete message in response to a transmission of a RRCEarlyDataRequest message using PUR, the UE autonomously releases (all) its PUR configuration(s). Alternatively, when the UE receives a RRCEarlyDataComplete message in response to a transmission of a RRCEarlyDataRequest message using PUR, the UE keeps (all) its PUR configuration(s).

For example, if the RRCConnectionRelease or RRCEarlyDataComplete message indicates that the UE should release (all) its PUR configuration(s), the UE releases (all) its PUR configuration(s). If the RRCConnectionRelease or RRCEarlyDataComplete message indicates that UE should keep (all) its PUR configuration(s), the UE keeps (all) its PUR configuration(s). For example, if the RRCConnectionRelease or RRCEarlyDataComplete message does not contain any PUR configuration, the UE releases (all) its PUR configuration(s). For example, if the RRCConnectionRelease or RRCEarlyDataComplete message does not contain any PUR configuration, the UE keeps (all) its PUR configuration(s). If the RRCConnectionRelease or RRCEarlyDataComplete message contains at least one (set of) PUR configuration, the UE updates accordingly.

In addition to keeping (all) the PUR configuration(s), the UE may suspend the use of (all) the PUR configuration(s). Suspension of a set of PUR configuration could mean that the UE does not perform a transmission using PUR associated with the set of PUR configurations. The UE could resume using the set of PUR configurations if the UE receives an indication from the NW indicating that the UE could use the set of PUR configuration.

NW response for PUR is received

The NW response for a PUR could be the response for a (re-)transmission using PUR. The NW response for a PUR could be the response for a retransmission scheduled by a dynamic UL grant for a PUR.

After the UE transmits UL data using a (set of) PUR configurations, but the UL data does not contain any RRC message, the NW response could be a Downlink Control Information (DCI) (e.g., a HARQ feedback), a dynamic UL grant for retransmission, or a DL message containing a MAC control element. The UE may determine whether to release or to keep the (set of) PUR configurations upon the reception of the NW response or determine whether to release or to keep the (set of) PUR configurations based on the content of the NW response.

For example, if a DCI indicating "ACK" is received, the UE keeps the set of PUR configurations. For example, if a DCI indicating "NACK" is received, the UE keeps the set of PUR configurations. For example, if a DCI indicating "NACK" is received, the UE releases the set of PUR configurations. For example, if no NW response is received within a time period, the UE keeps the set of PUR configurations. For example, if no NW response is received within a time period, the UE releases the set of PUR configurations. For example, if a dynamic UL grant for retransmission is received, the UE keeps the set of PUR configurations. For example, if a dynamic UL grant for retransmission is received, the UE releases the set of PUR configurations. For example, if a dynamic UL grant for retransmission is received, the UE updates the set of PUR configuration based on the dynamic UL grant.

For example, if a DL message is received in response to the transmission using PUR and the message does not contain TA-related information (e.g. Timing Advance Command), the UE autonomously releases the set of PUR configuration or releases (all) its PUR configuration(s). Alternatively, if a DL message is received in response to the transmission using a PUR and the message does not contain TA-related information (e.g., Timing Advance Command), the UE keeps (all) its PUR configuration(s).

In addition to keeping (all) the PUR configuration(s), the UE may suspend use of (all) the PUR configuration(s). Suspension of a set of PUR configurations could mean that the UE does not perform a transmission using a PUR associated with the set of PUR configurations. The UE could resume using the set of PUR configurations if the UE receives an indication from the NW indicating that the UE could use the set of PUR configurations.

Reception of paging-related signaling

In RRC_IDLE state, the UE monitors paging occasions for receiving paging messages. Some paging messages may not contain UE-id related information. Some paging messages may contain UE-id related information. In addition, if a wake-up signaling (WUS) is configured, the UE monitors WUS occasions for receiving WUS. If a group-based WUS is configured, the UE monitors group-based WUS occasions for receiving group-based WUS. The UE may determine whether to release or to keep set(s) of PUR configuration(s) upon the reception of paging messages or (group-based) WUS or determine whether to release or to keep set(s) of PUR configuration(s) based on the received paging messages or (group-based) WUS.

For example, the UE releases (all) its PUR configuration(s) in response to the reception of a Physical Downlink Control Channel (PDCCH) addressed to a Paging Radio Network Temporary Identifier (P-RNTI) with an indication in the PDCCH. For example, the UE releases (all) its PUR configuration(s) in response to the reception of a paging message containing UE-id related information for the UE. In another example, the UE releases (all) its PUR configuration(s) in response to the reception of paging messages containing an indication regardless of whether the paging message contains UE-id related information. In another example, the UE releases (all) its PUR configuration(s) in response to the reception of a WUS. In another example, the UE releases (all) its PUR configuration(s) in response to the reception of a group-based WUS. In another example, the UE releases (all) its PUR configuration(s) in response to the reception of a WUS containing an indication. In another example, the UE releases (all) its PUR configuration(s) in response to the reception of a group-based WUS containing an indication.

For example, the UE keeps (all) its PUR configuration(s) in response to the reception of a PDCCH addressed to P-RNTI with an indication in the PDCCH. For example, the UE keeps (all) its PUR configuration(s) in response to the reception of a paging message containing UE-id related information for the UE. In another example, the UE keeps (all) its PUR configuration(s) in response to the reception of paging messages containing an indication regardless of whether the paging message contains UE-id related information. In another example, the UE keeps (all) its PUR configuration(s) in response to the reception of a WUS. In another example, the UE keeps (all) its PUR configuration(s) in response to the reception of a group-based WUS. In another example, the UE keeps (all) its PUR configuration(s) in response to the reception of a WUS containing an indication. In another example, the UE keeps (all) its PUR configuration(s) in response to the reception of a group-based containing an indication.

In addition to keeping (all) the PUR configuration(s), the UE may suspend using (all) the PUR configuration(s). Suspension of a set of PUR configurations could mean that the UE does not perform a transmission using a PUR associated with the set of PUR configuration. The UE could resume using the set of PUR configurations if the UE receives an indication from the NW.

Combinations of the above examples are possible. For example, the UE keeps (all) its PUR configuration(s) if the UE receives a paging message without an indication, and the UE releases (all) its PUR configuration(s) if the UE receives a paging message, and the paging message contains an indication.

In the above-disclosed examples, the indication could indicate that the UE should release (all) the PUR configuration(s). Alternatively, the indication could indicate that the UE should keep (all) the PUR configuration(s). In another example, the indication could indicate that the UE should release the set(s) of PUR configuration(s) associated with a certain EC level or a certain radio condition. In another example, the indication could indicate that the UE should keep the set(s) of PUR configuration(s) associated with a certain EC level or a certain radio condition.

Indicated in system information (e.g., support of PUR is toggled)

Some of the parameters or information for a PUR could be broadcasted in the system information (SI). The UE acquires the SI(s), for example, upon re-selecting a Cell or upon receiving a notification that the system information has changed. The UE may determine whether to release or to keep the set(s) of PUR configuration(s) upon the acquisition of the SI(s) or determine whether to release or to keep the set(s) of PUR configuration(s) based on the content of the SI(s).

For example, an indication is included in the SI(s). The indication could be included in a SystemInformationBlock-Type1-BR and/or in a SystemInformationBlockType1-NB. In another example, the indication could be included in SystemInformationBlockType2 and/or in SystemInformationBlockType2-NB. In another example, the indication could be included in other SIB(s). In one example, the UE could release (all) its PUR configuration(s) if the indication indicates that the Serving Cell does not support PUR or the support of PUR is turned-off. In another example, the UE could release the set(s) of PUR configurations associated with a certain EC level (or a certain radio condition) if the indication indicates that the certain EC level of the Serving Cell does not support PUR or the support of PUR for the certain EC level is turned-off. In another example, the UE could keep (all) its PUR configuration(s) but does not use them if the indication indicates that the Serving Cell does not support PUR or the support of PUR is turned-off, and the UE could use its PUR configuration(s) later if the indication indicates that the Serving Cell supports PUR or the support of PUR is turned-on again. In another example, the UE could keep the set(s) of PUR configurations associated with a certain EC level (or a certain radio condition), but the UE does not use the set(s) of PUR configurations if the indication indicates that the certain EC level of the Serving Cell does not support PUR or the support of PUR for the certain EC level is turned-off, and the UE could use the set(s) of PUR configurations later if the indication indicates that the certain EC level of the Serving Cell supports PUR or the support of PUR for the certain EC level is turned-on again. In one example, based on the indication, the UE may release all its PUR configuration immediately after the UE acquires the SI(s). In another example, based on the indication, the UE may release all its PUR configuration when UL data becomes available for transmission. The indication in the system information may also be used to indicate that this Serving Cell supports PUR or PUR is supported for this Serving Cell.

Combinations of the above events are possible. For example, the UE keeps (all) its PUR configuration(s) when a TA for PUR becomes invalid and releases (all) its PUR configuration(s) when the UE enters RRC_CONNECTED state.

If UE releases a (set of) PUR configuration, the UE does not perform UL transmission using UL resources associated with the (set of) PUR configuration. After the UE releases at least a (set of) PUR configuration, the UE may initiate a RA procedure in response to reception of a dynamic UL grant for retransmission of PUR. After the UE releases at least a (set of) PUR configuration, the UE may immediately initiate a RA procedure. After the UE releases at least a (set of) PUR configuration, the UE may generate an indication and includes the indication in a Msg3 of a RA procedure to indicate the NW that UE has released at least a (set of) PUR configuration. The indication could be a MAC control element. The indication could be an RRC message.

In response to reception of the indication from the UE, the NW may determine that at least a (set of) PUR configuration is released by the UE, and could allocate the associated UL resources to another UE. Additionally or alternatively, when the UE enters RRC_CONNECTED state, the NW may determine that at least a (set of) PUR configuration is released by the UE, and could allocate the associated UL resources to another UE. Additionally or alternatively, in response to transmitting a message (e.g. HARQ feedback, paging message, MAC control element, and/or RRC message) to the UE, the NW may determine that at least a (set of) PUR configuration is released by the UE, and could allocate the associated UL resources to another UE.

In the above paragraphs, the solutions or actions could be applicable to only contention-based PUR, only contention-free PUR, or both contention-based and contention-free PUR. In the above paragraphs, the UE performs the solutions or actions in RRC_IDLE state or before entering RRC_CONNECTED state.

Figure 18:
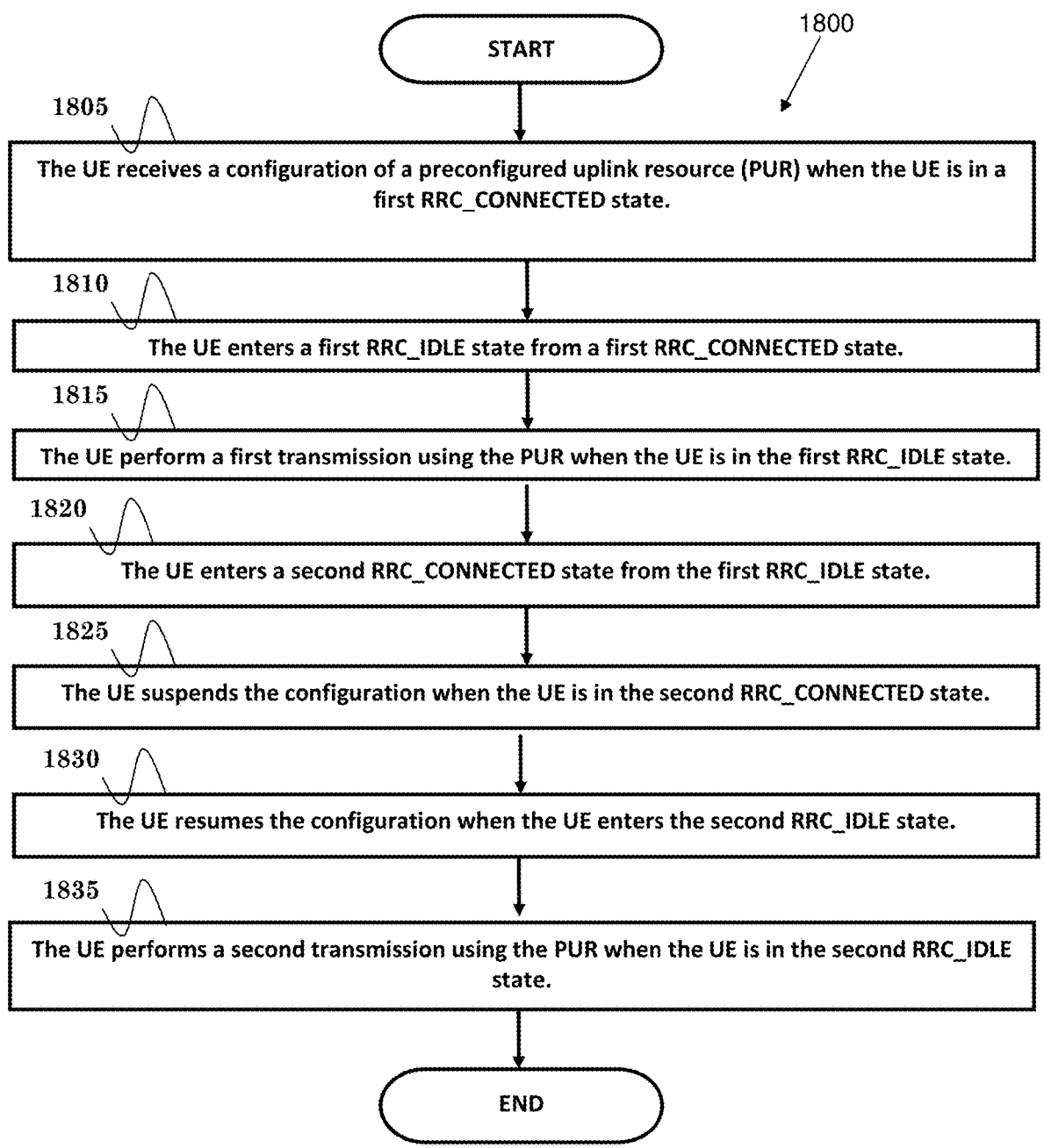
FIG. 18 is a flow diagram for one exemplary embodiment from the perspective of a User Equipment (UE).

FIG. 18 is a flow chart 1800 according to one exemplary embodiment from the perspective of a UE. In step 1805, the UE receives a configuration of a preconfigured uplink resource (PUR) when the UE is in a first RRC_CONNECTED state. In step 1810, the UE enters a first RRC_IDLE state from the first RRC_CONNECTED state. In step 1815, the UE performs a first transmission using the PUR when the UE is in the first RRC_IDLE state. In step 1820, the UE enters a second RRC_CONNECTED state from the first RRC_IDLE state. In step 1825, the UE suspends the configuration when the UE is in the second RRC_CONNECTED state. In step 1830, the UE resumes the configuration when the UE enters a second RRC_IDLE state from the second RRC_CONNECTED state. In step 1835, the UE performs a second transmission using the PUR when the UE is in the second RRC_IDLE state.

In another method, the UE keeps (or retains) the configuration when the configuration is suspended.

In another method, the UE does not perform transmissions (e.g., the first transmission and/or the second transmission) using the PUR if (or in response to) the configuration is suspended.

In another method, the method further includes releasing the configuration if (or in response to) the UE receives an indication in a system information to indicate that a serving cell does not support the PUR. In another method, the method further includes releasing the configuration if (or in response to) the UE receives an indication in a system information to indicate that support of the PUR is turned off.

In another method, the method further includes releasing the configuration based on an indication in a RRCConnectionRelease message. In another method, the method further includes releasing the configuration based on an indication in a RRCEarlyDataComplete message.

In another method, the method further includes releasing the configuration based on an indication in a paging message. In another method, the method further includes releasing the configuration based on an indication in a wake-up signaling (WUS).

In another method, the UE does not perform the transmissions using the PUR if (or in response to) the configuration is released.

In another method, the UE skips the transmissions using the PUR if (or in response to) the UE has no data available for the transmissions.

In another method, the configuration is provided to the UE in a dedicated signaling, such as a RRCConnectionRelease message.

In another method, the configuration includes at least one of the following parameters: a transport block size (TBS), a Modulation and Coding scheme (MCS), a time domain periodicity, a time domain offset, a frequency domain location/offset, a reference signal receive power (RSRP) threshold, a number of repetitions for each attempt of a transmission using PUR, a transmission power for each attempt of the transmission using PUR, and a power ramping step.

As those skilled in the art will appreciate, the various disclosed embodiments and/or methods may be combined to form new embodiments and/or methods.

Referring back to FIGS. 3 and 4, in one embodiment, the device 300 includes a program code 312 stored in memory 310. The CPU 308 could execute program code 312 to (i) receive a configuration of a preconfigured uplink resource (PUR) when the UE is in a first RRC_CONNECTED state, (ii) enter a first RRC_IDLE state from the first RRC_CONNECTED state, (iii) perform a first transmission using the PUR when the UE is in the first RRC_IDLE state, (iv) enter a second RRC_CONNECTED state from the first RRC_IDLE state, (v) suspend the configuration when the UE is in the second RRC_CONNECTED state, (vi) resume the configuration when the UE enters a second RRC_IDLE state from the second RRC_CONNECTED state, (vii) perform a second transmission using the PUR when the UE is in the second RRC_IDLE state.

Furthermore, the CPU 308 can execute the program code 312 to perform all of the above-described actions and steps or others methods described herein.

The above-disclosed methods allow the UE to release PUR configurations if PUR is not needed and does not release PUR configurations if PUR is still needed.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), the method comprising:
   receiving a configuration of a preconfigured uplink resource (PUR) when the UE is in a RRC_CONNECTED state for a first time;
   entering a RRC_IDLE state for a first time from the RRC_CONNECTED state, and performing a first transmission using the PUR when the UE is in the RRC_IDLE state;
   entering the RRC_CONNECTED state for a second time from the RRC_IDLE state, and suspending the configuration when the UE is in the RRC_CONNECTED state after performing the first transmission; and
   resuming the configuration when the UE enters the RRC_IDLE state for a second time from the RRC_CONNECTED state, and performing a second transmission using the PUR when the UE is in the RRC_IDLE state.

2. The method of claim 1, wherein the UE keeps the configuration when the configuration is suspended.

3. The method of claim 1, wherein the UE does not perform any transmission using the PUR if the configuration is suspended.

4. The method of claim 1, further comprising:
   releasing the configuration if the UE receives an indication in a system information to indicate that a serving cell does not support the PUR or to indicate that support of the PUR is turned off.

5. The method of claim 1, further comprising:
   releasing the configuration based on an indication in a RRCConnectionRelease message or a RRCEarlyDataComplete message.

6. The method of claim 1, further comprising:
   releasing the configuration based on an indication in a paging message or a wake-up signalling.

7. The method of claim 1, wherein the UE does not perform any transmission using the PUR if the configuration is released.

8. The method of claim 1, wherein the configuration is provided to the UE in a dedicated signaling.

9. The method of claim 1, wherein the configuration includes at least one of the following parameters: a transport block size, a Modulation and Coding scheme, a time domain periodicity, a time domain offset, a frequency domain location/offset, a reference signal receive power (RSRP) threshold, a number of repetitions for each attempt of a transmission using the PUR, a transmission power for each attempt of the transmission using the PUR, and a power ramping step.

10. A User Equipment (UE), the UE comprising:
    a control circuit;
    a processor installed in the control circuit; and
    a memory installed in the control circuit and coupled to the processor;
    wherein the processor is configured to execute a program code stored in the memory to:
      receive a configuration of a preconfigured uplink resource (PUR) when the UE is in a RRC_CONNECTED state for a first time;
      enter a RRC_IDLE state for a first time from the RRC_CONNECTED state, and performing a first transmission using the PUR when the UE is in the RRC_IDLE state;
      enter the RRC_CONNECTED state for a second time from the RRC_IDLE state, and suspending the configuration when the UE is in the RRC_CONNECTED state after performing the first transmission; and
      resume the configuration when the UE enters the RRC_IDLE state for a second time from the RRC_CONNECTED state, and performing a second transmission using the PUR when the UE is in the RRC_IDLE state.

11. The UE of claim 10, wherein the UE keeps the configuration when the configuration is suspended.

12. The UE of claim 10, wherein the UE does not perform any transmission using the PUR if the configuration is suspended.

13. The UE of claim 10, further comprising:
    releasing the configuration if the UE receives an indication in a system information to indicate that a serving cell does not support the PUR or to indicate that support of the PUR is turned off.

14. The UE of claim 10, further comprising:
    releasing the configuration based on an indication in a RRCConnectionRelease message or a RRCEarlyDataComplete message.

15. The UE of claim 10, further comprising:
    releasing the configuration based on an indication in a paging message or a wake-up signalling.

16. The UE of claim 10, wherein the UE does not perform any transmission using the PUR if the configuration is released.

17. The UE of claim 10, wherein the configuration is provided to the UE in a dedicated signaling.

18. The UE of claim 10, wherein the configuration includes at least one of the following parameters: a transport block size, a Modulation and Coding scheme, a time domain periodicity, a time domain offset, a frequency domain location/offset, a reference signal receive power (RSRP) threshold, a number of repetitions for each attempt of a transmission using the PUR, a transmission power for each attempt of the transmission using the PUR, and a power ramping step.

* * * * *